US011280885B2

(12) United States Patent
Stann et al.

(10) Patent No.: US 11,280,885 B2
(45) Date of Patent: Mar. 22, 2022

(54) LADAR RECEIVER

(71) Applicant: U.S. Army Combat Capabilities Development Command ARL ATTN: FCDD-RLL-CI, Adelphi, MD (US)

(72) Inventors: Barry L. Stann, Edgewater, MD (US); Mark M. Giza, Kensington, MD (US)

(73) Assignee: America as represented by the Secretary of the Army

( * ) Notice: Subject to any disclaimer, the term of this patent is extended or adjusted under 35 U.S.C. 154(b) by 406 days.

(21) Appl. No.: 16/377,318

(22) Filed: Apr. 8, 2019

(65) Prior Publication Data

US 2020/0025883 A1 Jan. 23, 2020

Related U.S. Application Data

(63) Continuation-in-part of application No. 15/340,307, filed on Nov. 1, 2016, now Pat. No. 10,444,330.

(51) Int. Cl.
G01S 7/48 (2006.01)
G01S 7/481 (2006.01)

(52) U.S. Cl.
CPC .................. G01S 7/4816 (2013.01)

(58) Field of Classification Search
None
See application file for complete search history.

(56) References Cited

U.S. PATENT DOCUMENTS

| 5,638,163 | A | 6/1997 | Nourrcier, Jr. |
| 8,081,301 | B2 | 12/2011 | Stann et al. |
| 2014/0350836 | A1 | 11/2014 | Stettner et al. |
| 2015/0177383 | A1 | 6/2015 | Ruff et al. |
| 2016/0003946 | A1 | 1/2016 | Gilliland et al. |
| 2017/0005574 | A1 | 1/2017 | Wyland |

OTHER PUBLICATIONS

Stann, B. L. et al., "Brass Board Development of a MEMS-scanned LADAR Sensor for Small Ground Robots," Proc. SPIE Laser Radar Technology and Applications XVI, vol. 8037, (2011).
Stann, B. L. et al., "Integration and Demonstration of MEMS-scanned LADAR for Robotic Navigation," Proc. SPIE Unmanned Systems Technology XVI, vol. 9084, (2014).
Wijewarnasurya, P.S. et.al., "Advances in large area Hg1-xCdxTe Photovoltaic Detectors for Remote Sensing Applications," Journal of Electronic Materials, vol. 31, No. 7, 2002.
Holloway, H.,"IV-VI Semiconductor Lateral-collection Photodiodes," J. Appl. Phys. 49, 4264 (1978).
Stann, B.L., Dammann, J.F., Giza, M.M., "Progress on MEMS-scanned Ladar," InSPIE Defense+ Security May 13, 2016 (pp. 98320L-98320L). International Society for Optics and Photonics; Conference vol. 9832 doi:10.1117/12.2223728.
Stann, B.L., et al. "Low-cost, Compact Ladar Sensor for Small Ground Robots," Proceedings of the SPIE, The International Society for Optical Engineering, vol. 7323, 73230X (2009) Publication Date: May 2009.

(Continued)

Primary Examiner — Hovhannes Baghdasaryan
(74) Attorney, Agent, or Firm — Eric B. Compton

(57) ABSTRACT

A system, device, apparatus and method for receiving a laser signal such as within a LADAR receiver.

19 Claims, 16 Drawing Sheets

Preferred embodiment enhanced receiver circuit diagram.

(56) References Cited

OTHER PUBLICATIONS

Stann, B.L., Dammann, J.F., Giza, M.M., Jian, P.S., Lawler, W.B., Nguyen, H.M. and Sadler, L.C., "MEMS-scanned Ladar Sensor for Small Ground Robots," In SPIE Defense, Security, and Sensing (pp. 76841E-76841E). Apr. 2010, International Society for Optics and Photonics.

Barry Stann, John Dammann, Mark Giza, William Ruff, "MEMS-scanned ladar for small unmanned air vehicles," presentation and paper, SPIE. DCS Defense+Security Conference Apr. 15-19, 2018, Orlando, Fl. (Presented at Session 4, Tuesday Apr. 17, 2018).

FIG. 1 Prior art MEMS Ladar Block Diagram and Mirror

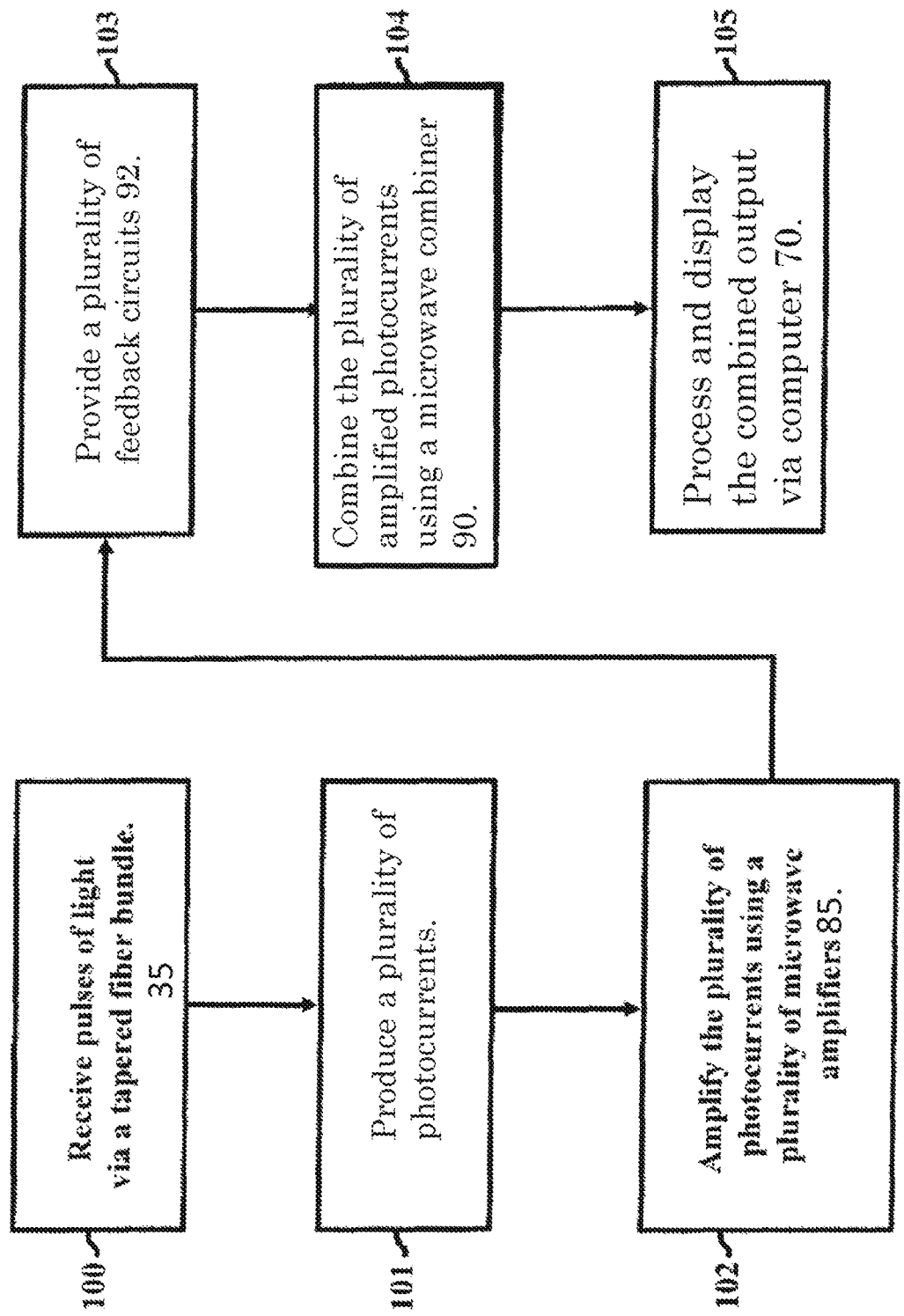

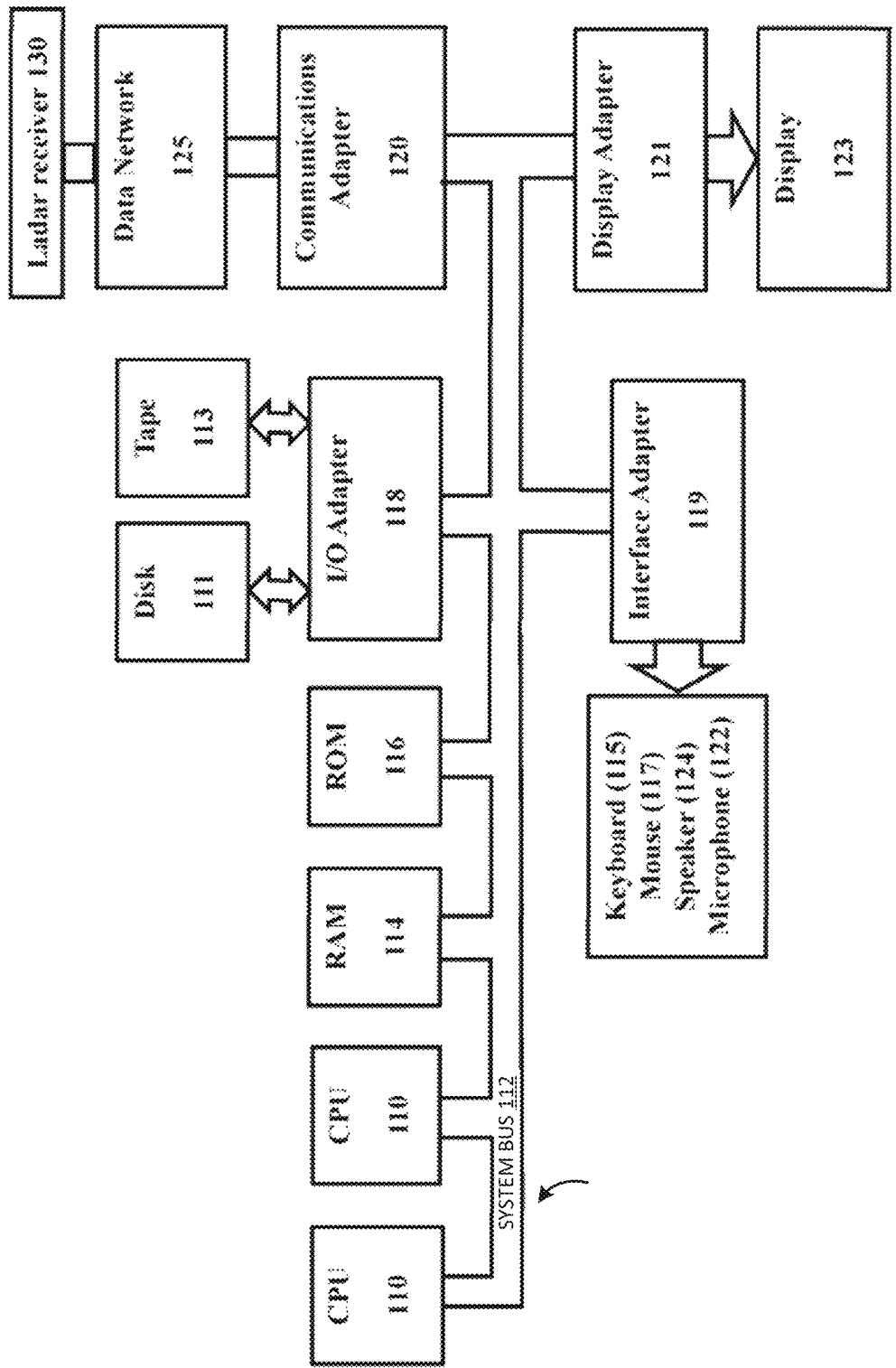
Figure 4. Representative Computing Environment

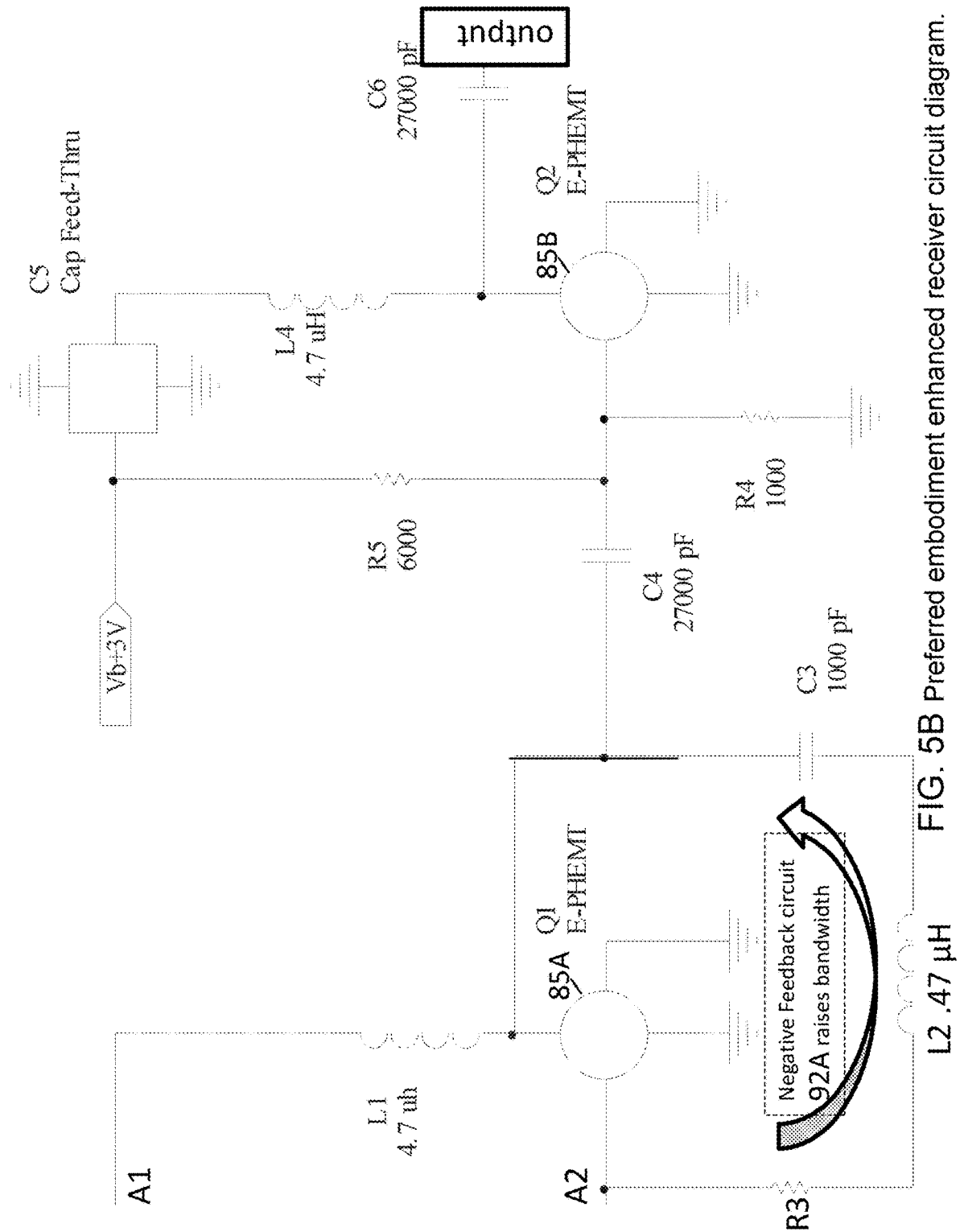
FIG. 5B Preferred embodiment enhanced receiver circuit diagram.

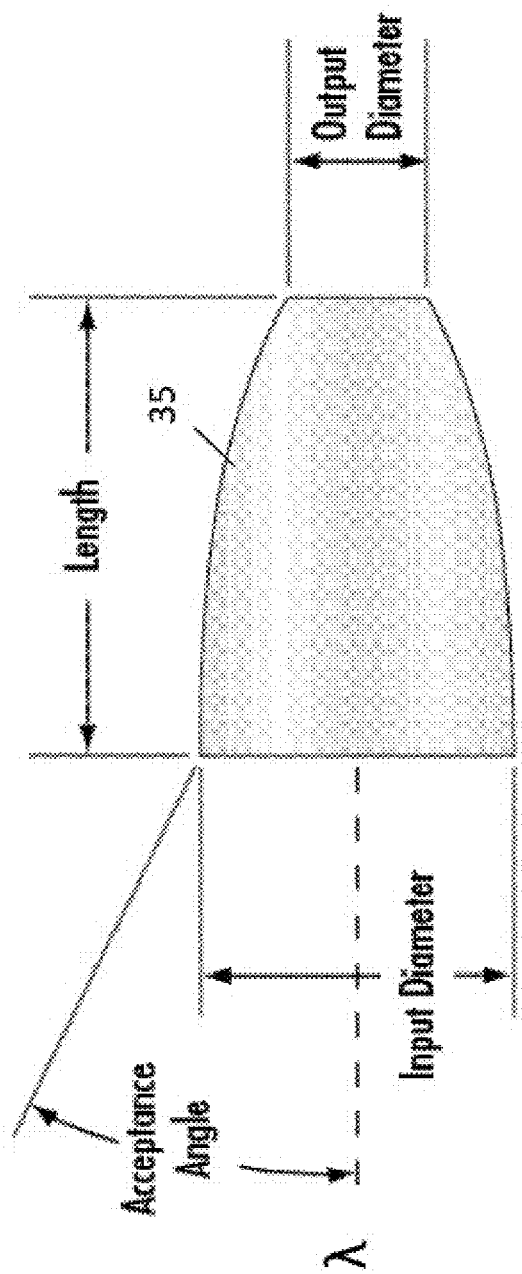
FIG. 6 Example of Preferred embodiment of a light concentrator

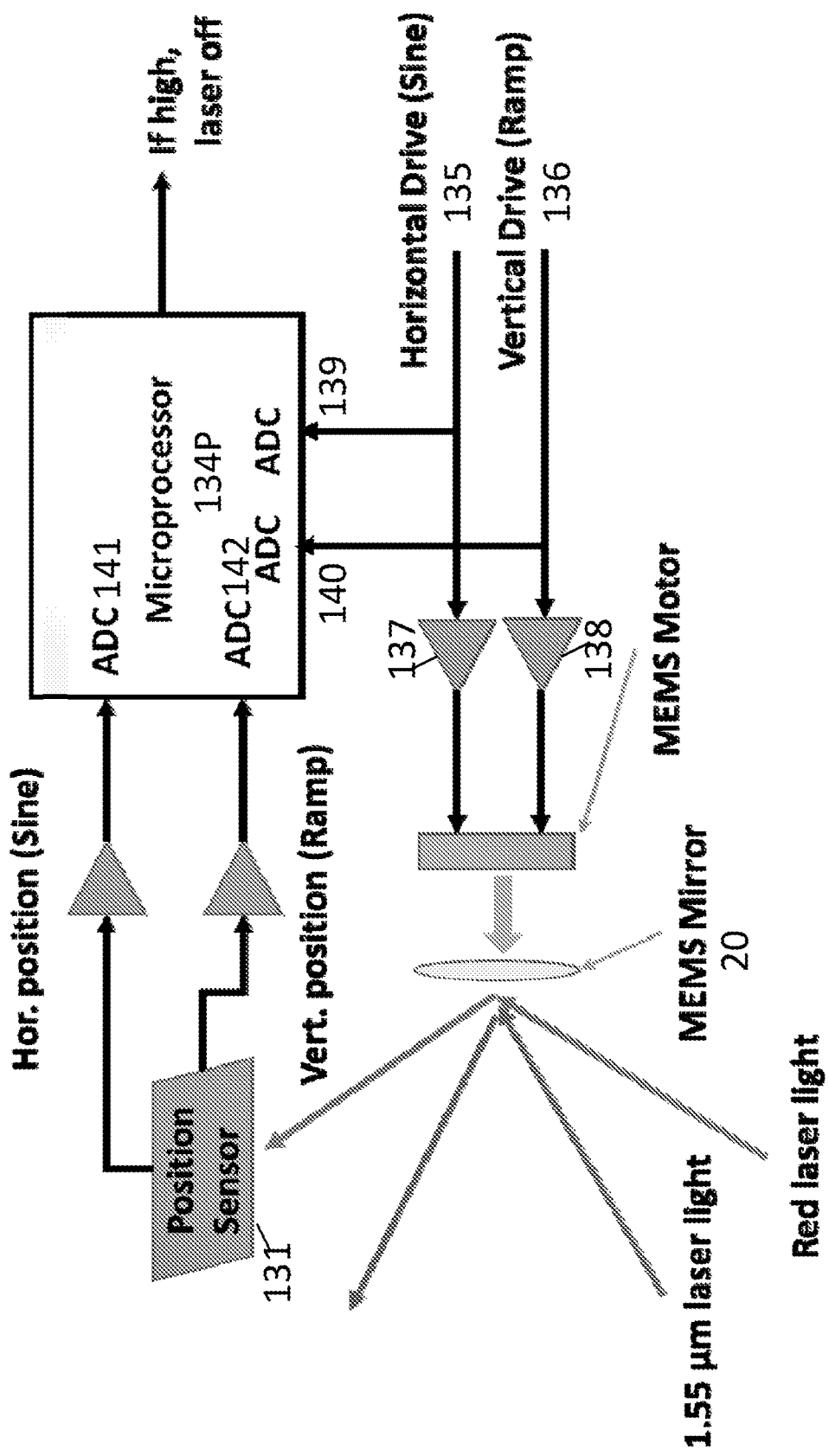
FIG. 7 Block diagram- eye-safety system.

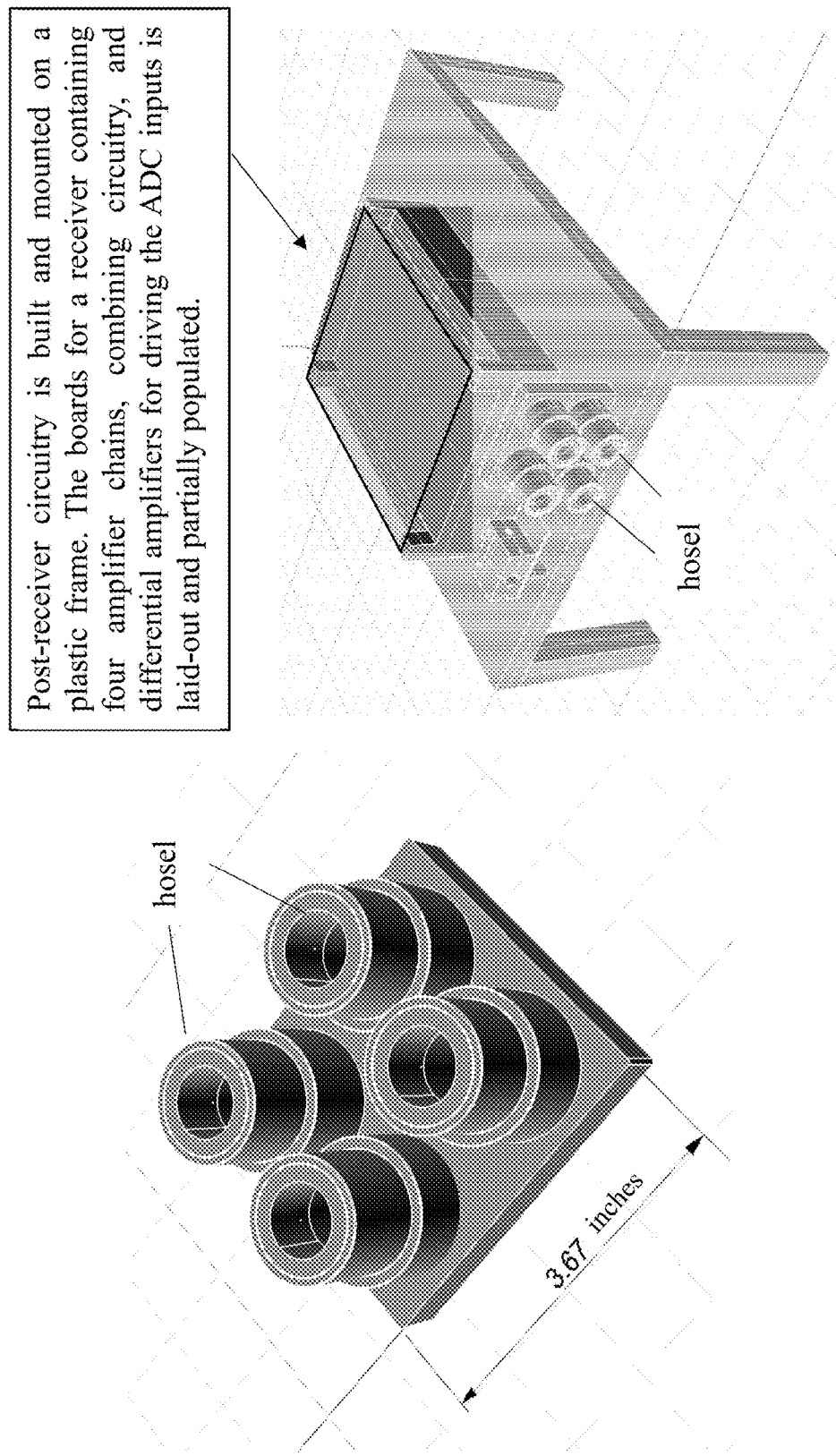
Figure 8. Ladar breadboard Receiver
A case for the receiver is shown that includes four hosels for holding the light concentrators with a mechanism for allowing the introduction of the index matching gel.

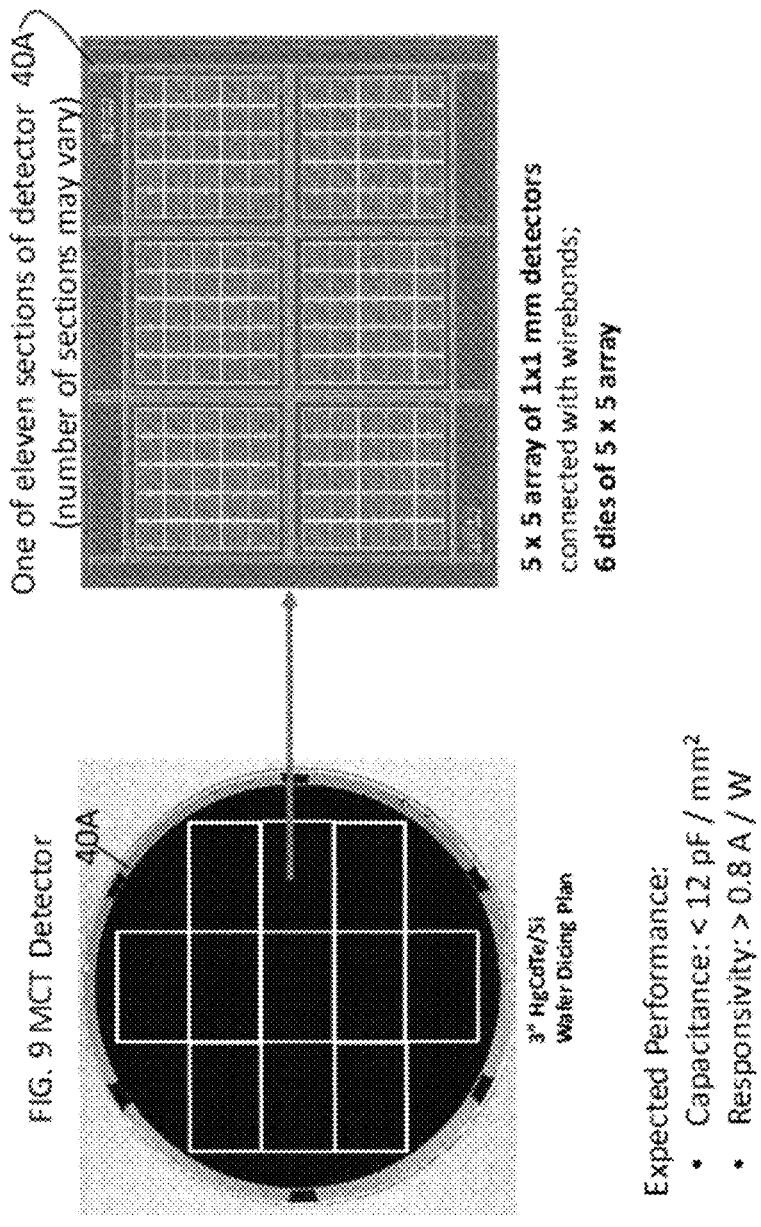

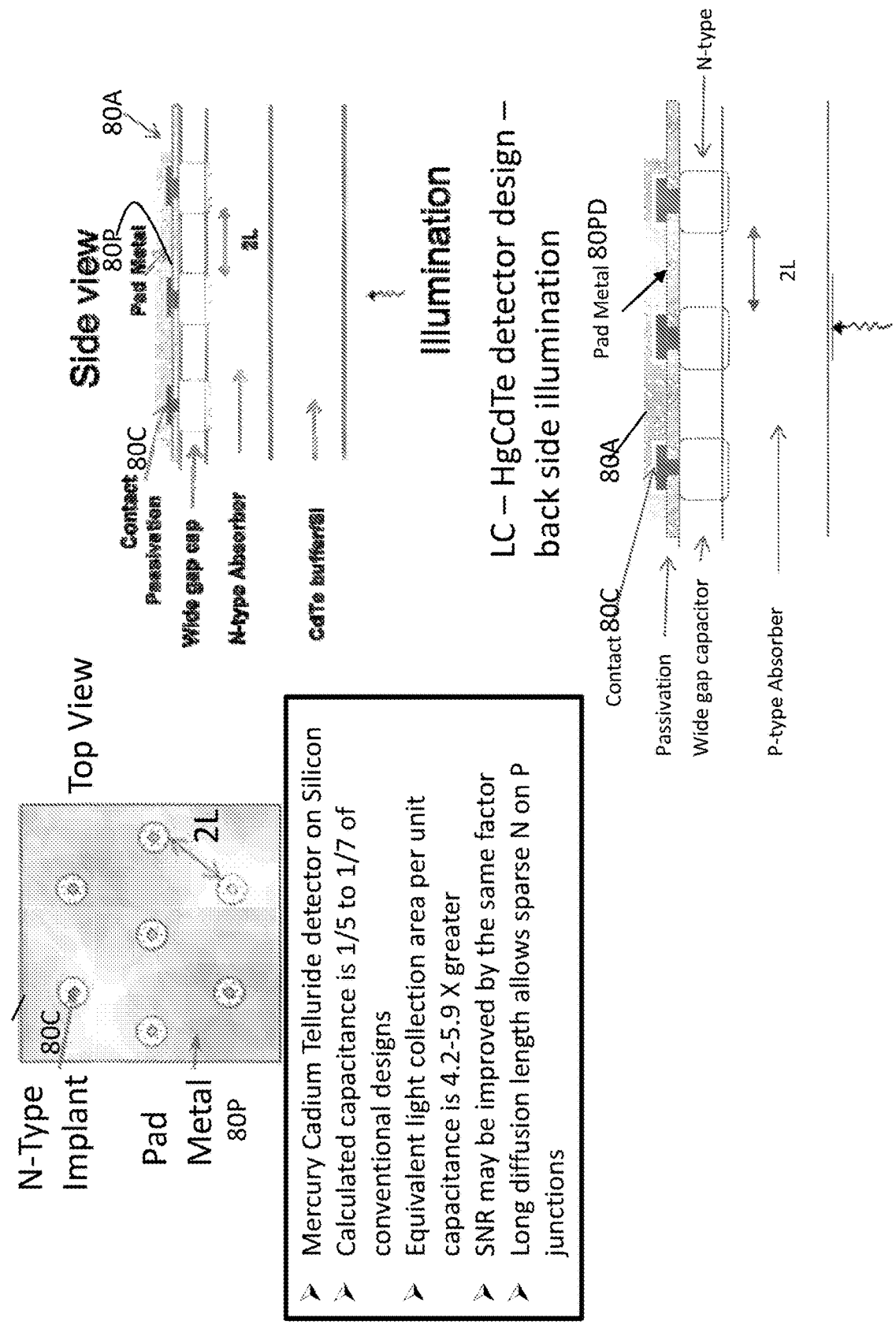
FIG. 10 Large-area, Low-capacitance Detector 80A

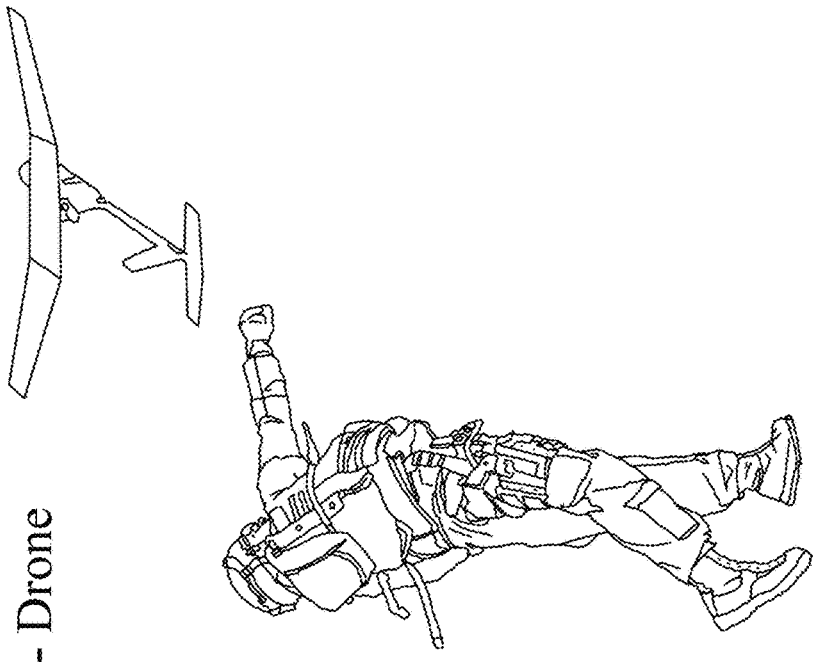

FIG. 11 Ladar for UAV Application - Drone

- Preferred embodiment has detection of 20% reflectivity targets to 160 m and 30 cm pixel size at ground
- Preferred embodiment may be used for flight tests on helicopter or other surrogate
- Collects imagery from multiple aspect angles, register, and with foliage penetration
- Receiver uses four commercial InGaAs detectors. Utilizes GRIN lens and mirror chain with 2.5 W laser

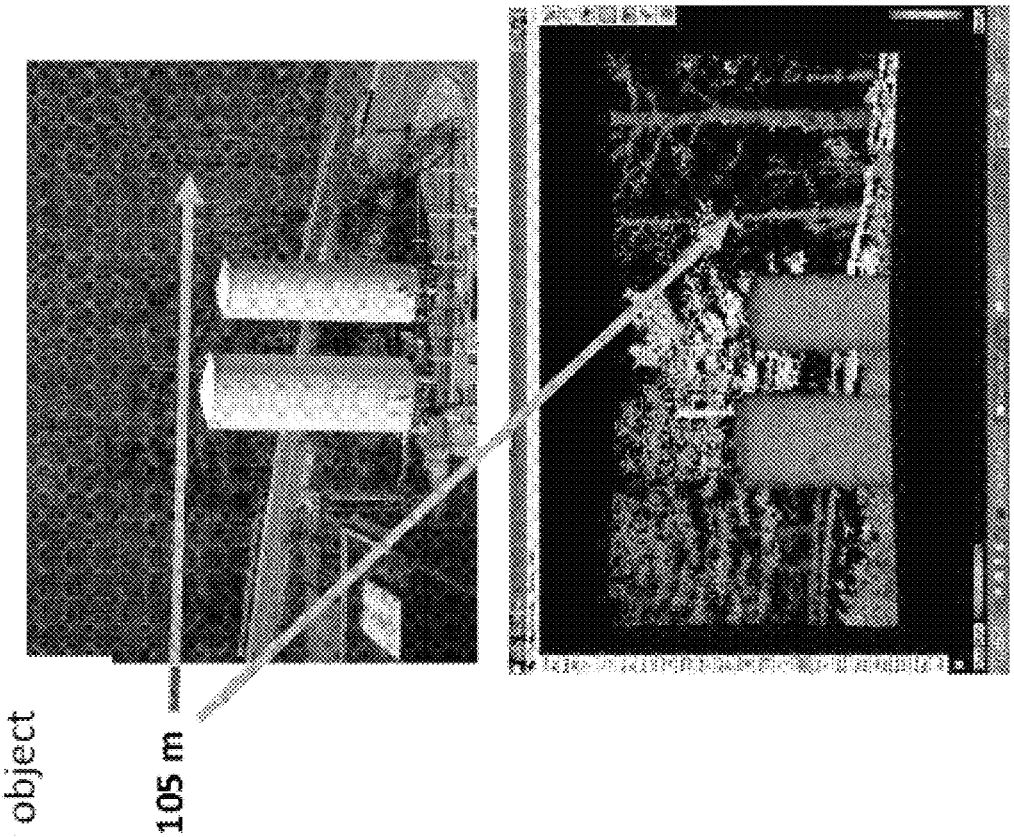
FIG. 12 LADAR imagery showing object at 105 meters

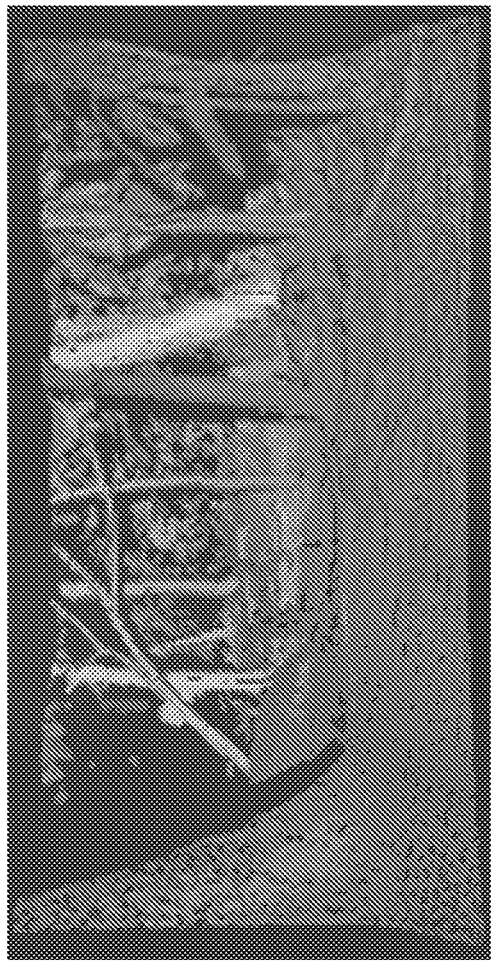
FIG. 13A Sample ladar imagery (Direct view left)
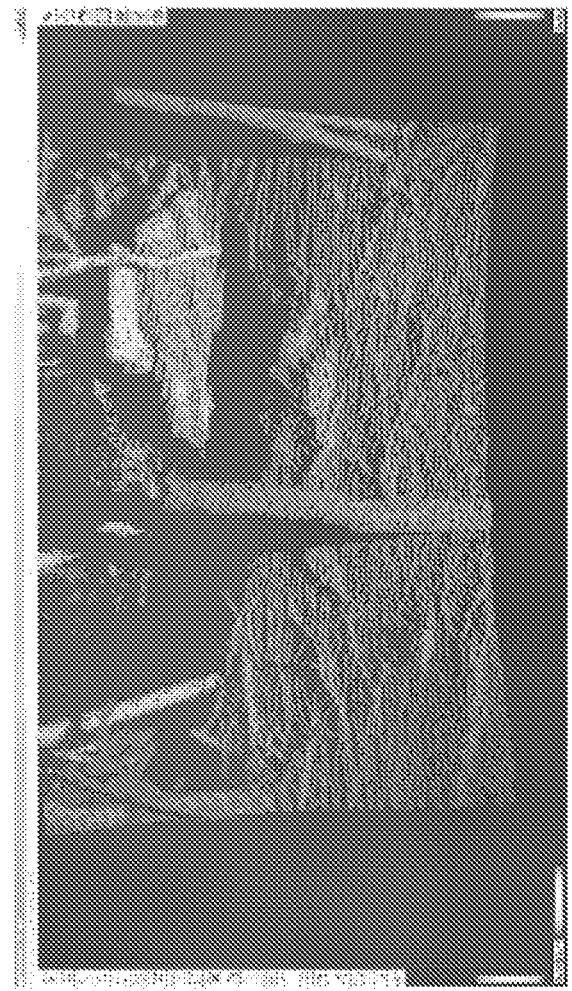
FIG. 13B Sample ladar imagery - elevated viewpoint.

LADAR RECEIVER

CROSS-REFERENCE TO RELATED APPLICATION

This application is a continuation-in-part of U.S. patent application Ser. No. 15/340,307 filed on Nov. 1, 2016 and entitled LADAR RECEIVER WITH ENHANCED SIGNAL TO NOISE RATIO AND METHOD, which application is incorporated herein by reference in its entirety.

GOVERNMENT INTEREST

The embodiments herein may be manufactured, used, and/or licensed by or for the United States Government without the payment of royalties thereon.

BACKGROUND OF THE INVENTION

The present invention relates to a LADAR transmitting and receiving apparatus, and, more particularly, to a compact LADAR receiving apparatus with enhanced signal-to-noise performance and bandwidth.

LADAR/LIDAR (Light Detection And Ranging/Light Imaging, Detection, And Ranging) measures distance by illuminating a target with a laser light. Lidar may be used for a variety of purposes including high-resolution maps (including airborne laser swath mapping (ALSM)) and laser altimetry. Lidar is alternately referred to as laser scanning or 3D scanning; with terrestrial, airborne and mobile applications. Laser Detection And Ranging (LADAR) is an optical remote sensing technology that measures properties of scattered light to find range and/or other information of a distant target. LADAR may be used in a variety of contexts for elastic backscatter light detection and ranging (LIDAR) systems. Although the acronym LADAR is usually associated with the detection of hard targets and the acronym LIDAR is usually associated with the detection of aerosol targets, there has been no real standard on their use and both acronyms may be used interchangeably to describe the same laser ranging system. Accordingly, as used herein, the terminology LIDAR means LADAR and vice versa.

LADAR systems typically operate in the ultraviolet, visible, or near infrared spectrums, which gives a compact LADAR the ability to image a target at a high spatial resolution and allows LADAR systems to be made more physically compact.

As reported in U.S. Pat. No. 8,081,301, in order for a LADAR system target to reflect a transmitted electromagnetic wave, an object needs to produce a conductive or dielectric discontinuity from its surroundings. At radar frequencies, a metallic object produces a conductive discontinuity and a significant specular reflection. However, non-metallic objects, such as rain and rocks produce weaker dielectric reflections, and some materials may produce no detectable reflection at all, meaning some objects or features are effectively invisible at radar frequencies. Lasers provide one solution to this problem regarding non-metallic detection. The beam power densities and coherency of lasers are excellent. Moreover, the wavelengths are much smaller than can be achieved with radio systems, and range from about 10 μm to around 250 nm. At such wavelengths, the waves are reflected very well from small objects such as molecules and atoms. This type of reflection is called diffuse "backscattering." Both diffuse and specular reflection may be used for different LADAR applications.

Some prior art LADAR systems have transmitter and receiver functions that rely on a co-axial or mono-static optical system that comprises a complex assembly of beam splitters, polarizers, and steering mirrors that is very difficult to align, prone to losing alignment, subject to narcissus, and requiring excessive space for a compact LADAR system. As reported in U.S. Pat. No. 8,081,301, compact LADAR systems have generally been flawed by one or more factors including, low pixelization, insufficient range or range resolution, image artifacts, no daylight operation, large size, high power consumption, and high cost. Prior art systems may use a wide bandwidth photo detector/amplifier system with a small detector, and a low shunt capacitance, leading to a low signal-to-noise ratio or small field-of-view.

SUMMARY

Various deficiencies in the prior art are addressed below by a system, device, apparatus and method for receiving a laser signal such as within a LADAR receiver.

One embodiment comprises a LADAR receiver comprising a photodetector, a first amplifier and a second amplifier; the photodetector configured to generate a photocurrent in response to incident light, the photodetector being associated with a capacitance and configured to operate at a bias voltage level above ground, wherein a resonant circuit is formed in accordance with the photodetector capacitance and an inductive coupling of the photodetector to ground, wherein the inductive coupling of the photodetector to ground is minimized using multiple ground connections of the photodetector when mounted on a printed circuit board (PCB); the first amplifier including a first Enhancement mode Pseudomorphic High Electron Mobility Transistor (E-PHEMT) configured to amplify the photocurrent received from the photodetector to produce a first output signal, the first transistor comprising a gate coupled to receive the photocurrent, a source coupled to ground, and a drain coupled to a second bias voltage via an inductor and coupled to the photodetector via a feedback circuit comprising at least a capacitance, wherein the feedback circuit operates to limit a reduction in first amplifier bandwidth caused by the resonant circuit; the second amplifier including a second E-PHEMT, the second amplifier configured to present a high impedance load to the first output signal and responsively generate a second output signal.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 3 shows the processing steps relevant to a MEMS-scanned LADAR.

FIG. 4 is a block diagram of an example of the computing environment for the preferred embodiment MEMS-scanned LADAR data capture system.

FIG. 5B is a schematic illustration (Part II) of a hardware configuration of a preferred embodiment of the invention herein.

FIG. 6 is an illustration depicting a light concentrator for use with a preferred embodiment of the present invention.

FIG. 7 is a block diagram illustration of an eye safety system which may be used in association with an alternate preferred embodiment of the present invention.

FIG. 8 is an illustration showing the hosels associated with light concentrators which may be used with a preferred embodiment of the present invention.

FIG. 9 is an illustration showing alternate photodetector for use in a preferred embodiment of the present invention. Shown to the left is a three-inch diameter HgCdTe/Si wafer. As shown to the right, each block of the detector 40A comprises a 5×5 arrays of 1×1 mm detectors connected with wire bonds.

FIG. 10 is an illustration showing a detector using mercury cadmium telluride (MCT) on silicon.

FIG. 11 is an illustration showing an application of the present invention relating to an unmanned aerial vehicle (UAV) drone.

FIG. 12 is an illustration showing imagery at 105 m range obtainable using a preferred embodiment of the present invention.

FIG. 13A is an illustration showing an example of LADAR imagery.

FIG. 13B is an illustration showing another example of LADAR imagery.

Figure 1:
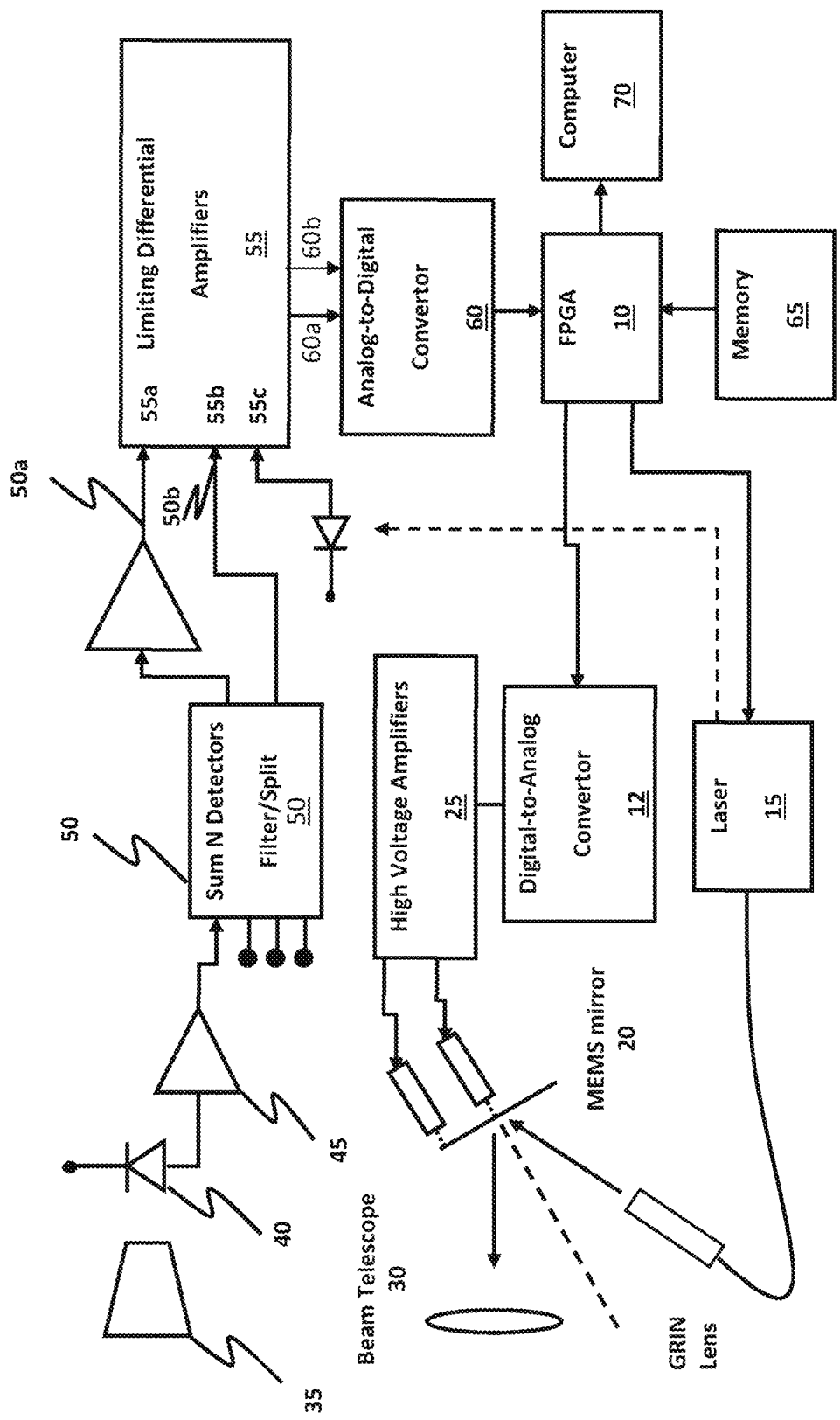
FIG. 1 is a schematic block diagram of a prior art MEMS LADAR and mirror.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various ranges, elements, components, regions, layers and/or sections, these elements, components, regions, layers and/or sections should not be limited by these terms. For example, when referring first and second ranges, these terms are only used to distinguish one range from another range. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent. As may be used herein, the term "substantially negligible" means there is little relative difference, the little difference ranging between less than one percent to ten percent. As may be used herein, the term "significantly" means of a size and/or effect that is large or important enough to be noticed or have an important effect. As used herein the terminology "substantially all" means for the most part; essentially all.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention. Additionally, the drawings are not to scale. Relative sizes of components are for illustrative purposes only and do not reflect the actual sizes that may occur in any actual embodiment of the invention. Like numbers in two or more figures represent the same or similar elements. Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Embodiments of the present invention are described herein with reference to cross-section illustrations that are schematic illustrations of idealized embodiments of the present invention. As such, variations from the shapes of the elements in the illustrations are to be expected. Thus, embodiments of the present invention should not be construed as limited to the particular shapes of regions illustrated herein but are to include deviations in shapes. Thus, the layers or regions illustrated in the figures are schematic in nature and their shapes are not intended to illustrate the precise shape of a layer or region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is directed to a novel approach to the design of a photocurrent receiver required in compact, low-power, and low-cost laser radar (LADAR).

The receiver circuit design is an improvement in terms of signal-to-noise ratio and bandwidth over a design described in a prior patent "Ladar Transmitting and Receiving System and Method," U.S. Pat. No. 8,081,301.

The ability of a laser radar to detect targets at a specified range and field-of-view (FOV) is directly related to the amount of light captured by its receiver front-end optics and following photodiode. In applications where the FOV is large, then the photodiode size must be also large. At the same time the receiver bandwidth comprised of the photodiode and following amplifier must be sufficiently wide to pass a short duration pulse that may have a bandwidth in the range of 200-300 MHz. When a large area photodiode is connected directly to a conventional microwave amplifier with an input impedance of 50 ohms, the photodiode capacitance is large enough that the circuit bandwidth (i.e. receiver) is well below the requirement to pass the detected light pulse. The present invention is directed to a laser radar receiver comprised of an amplifier circuit and large area photodiode that provides improved bandwidth and signal-to-noise (SNR) performance over the prior design described in U.S. Pat. No. 8,081,301.

The problem of designing a low-cost laser radar around a wide FOV receiver using a large area photodiode has not been pursued because designers realized that standard methods of photocurrent amplification could not attain the bandwidth and SNR needed to pass a short pulse and detect the pulse at useful ranges. The present invention largely solves that problem.

Breadboard models of the receiver using various detector sizes and amplifier circuit parameters have been built and extensively tested. This work verified that the receiver SNR is improved 4-5 fold over the SNR obtained with the receiver design described in U.S. Pat. No. 8,081,301 for equal bandwidths. More SNR may be gained through more judicious circuit board layout in the future. This SNR improvement is important because it extends the range of LADAR two-fold.

The present invention is useable in compact, low-power, and low-cost laser radars that may find use in autonomous small ground robots and some large ground vehicles. Other system applications include surveillance from small UAVs at short ranges and smart munitions. Laser radars with the receiver invention could find extensive use in autonomous automobiles, architectural engineering and design mensuration, and machine control. In the future, the receiver should find use in other variants of the MEMs-scanned LADAR described in U.S. Pat. No. 8,081,301. These LADARs may serve in military applications such as small ground robots, large ground vehicles, and other small UAVs and commercial applications including autonomous automobiles, architectural mensuration and design, and machine control.

FIG. 1 illustrates a schematic diagram of LADAR transceiver wherein a trigger signal from field-programmable gate array (FPGA) 10 commands laser 15 (e. g., an Erbium fiber laser) to emit a short pulses of light (e.g., 2-3 ns pulses, at 200 kHz). These pulses of light are collimated using a GRIN lens, for example, and then directed to the surface of mirror 20 (e.g., may be embodied as a small microelectromechanical system (MEMS) mirror). In addition, analog voltages from high voltage amplifier (HV Amp) 25 control the pointing direction of mirror 20. As the pulses of light are reflected from mirror 20, they are subsequently fed into telescope 30 to amplify the reflected angle. Light backscattered upon hitting a target is collected on the large face of fiber bundle 35, which may be tapered. Tapering of the fiber bundle 35 effectively increases the diameter of photo detector 40 and thereby increases the signal-to-noise ratio. Other means to increase light impinging on the photo detector such as light concentrators or lenses may also be used. Photocurrent from photo detector 40 is fed into amplifier 45, which may be embodied as a monolithic 50 ohm microwave amplifier. The outputs of additional fiber taper/detector/amplifier chains may be fed into a summer 50 with additional filtering and splitting functions to improve the LADAR signal-to-noise ratio. The output of the summer 50 after the filtering is fed into power divider that splits the signal into low gain channel 50a and high gain channel 50b. In radio frequency (RF) interface board 55, both low gain channel 50a and high gain channel 50b are adjusted in amplitude and limited in amplitude to produce output channels 60a and 60b. In addition, inputs to RF interface board 55 are summed with a photocurrent from an undelayed sample of the original transmitted light signal, shown as T-zero 55c in FIG. 1. T-zero 55c pulse of the transmitted signal is optionally used as a reference to determine target range. Output channels 60*a* and 60*b* are subsequently fed into analog-to-digital converter (ADC) 60, shown in FIG. 1 as a two channel 8-bit ADC, via input channels 60*a* and 60*b*. ADC 60 optionally samples input channels 60*a* and 60*b* at a 1.5 giga-samples-per-second (GSPS) rate for example. This sampled data is fed to field programmable gate array 10, which stores the sampling data as a function of time from ADC 60 in memory 65.

Memory 65 is optionally a first-in first-out register (FIFO), and starts storing analog-to-digital converter (ADC) 60 sampling data upon transmission of the laser 15 pulse. In addition to storing sampling data from ADC 60, field programmable gate array (FPGA) 10 determines the range to the pixel, and formats the data for acquisition by computer 70 for display. FPGA 10 also controls the pointing direction of mirror 20 (e.g., via digital-to-analog converter (DAC) 12) and directs the laser 15 to emit a pulse.

To increase the receiver capture area for a given size of photo detector 40, a tapered fiber bundle 35 may be used to magnify the apparent size of a photo detector (e.g., a 1 mm diameter photo detector can theoretically increase its effective diameter to 3.1 mm at the front of a tapered fiber bundle 35, when the tapered fiber bundle 35 has a magnification ratio equal to 3.1:1). The theoretical maximal effect of magnifying tapered fiber bundle 35 is often not reached if photo detector 40 is a commercially packaged photo detector since the packaging of the commercial photo detectors typically cannot couple the output of tapered fiber bundle 35 directly against the detector surface of photo detector 40 to capture all of the light. In addition, the capacitance of photo detector 40 may limit the output bandwidth of amplifier 45 (e.g., a photo detector with a 1 mm diameter detecting surface may limit bandwidth to about 85 MHz when fed directly into a 50 ohm microwave amplifier). This issue is addressed via an R-L-C circuit 92 (shown in FIG. 2) between photo detector 40 and amplifier 45 output to extend the bandwidth with a tolerable level of pulse distortion and stretching.

Figure 2:
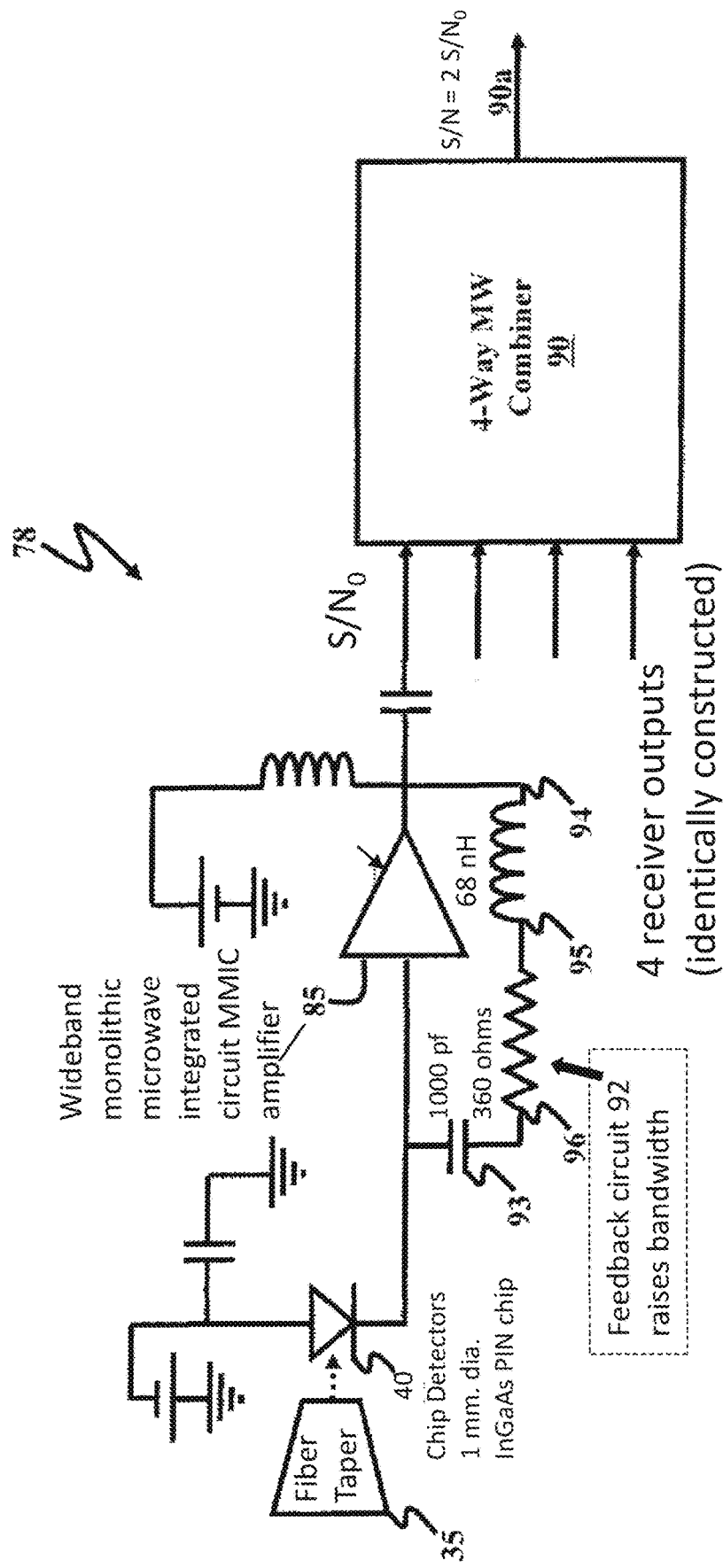
FIG. 2 is a schematic of a prior art MEMS-scanned LADAR receiver.

FIG. 2 shows an amplifier scheme in the prior art that solved the bandwidth problem identified in the previous paragraph. As shown in FIG. 2, photo detector 40 may include a PIN InGaAs photo detector, which is preferable to an avalanche photodetector. The principal for extending the bandwidth is based on a feedback circuit comprised of an inductor 94, capacitor 93 and resistor 96.

Recent advances in Erbium fiber lasers have allowed Erbium fiber lasers to be manufactured as physically smaller units, and at a lower cost, than what was previously available. The electrical and optical parameters of these new Erbium fiber lasers are identical to the previous fiber laser technology except that the peak power has been reduced, e.g., the peak power of a low-cost Erbium fiber laser may be one-fourth of the peak power of a current fiber laser. FIG. 2 shows receiver 78 that compensates for a loss in signal power when using a laser with reduced peak power, according to the embodiments described herein. Similar to FIG. 1, FIG. 2 includes fiber bundle 35 to enhance the optical capture area. FIG. 2, however, uses a plurality of chip detectors 40 instead of a single photo detector. For example, since each PIN chip detector 40 may be only 1 mm square, four PIN chip detectors 40 may be coupled to the output of fiber bundle 35. FIG. 2 illustrates a single PIN chip detector 40. The output of each PIN chip detector 40 is fed into a separate microwave amplifier 85. The output of each microwave amplifier 85 is fed into an n-way microwave combiner 90. Microwave combiner 90 yields target signal 90*a* that has an improved signal-to-noise ratio compared to the individual output of any of microwave amplifier 85.

Although FIG. 2 uses a four-way microwave combiner 90, to match the number of PIN chip detectors 40 and microwave amplifiers 85 combinations (only one of which is shown in FIG. 2), the embodiments described herein are not limited to a four-way microwave combiner and those skilled in the art could readily increase or decrease the number of inputs to microwave combiner 90 to match increases or decreases in the number of PIN chip detectors 40 and microwave amplifiers 85 combinations used.

The circuit shown in FIG. 2 also includes feedback circuit 92 positioned as a feedback loop for the output of microwave amplifier 85 to raise the overall bandwidth. In feedback circuit 92, capacitor 93 comprises a large capacitor used to decouple DC signal 94 at amplifier 85 output from the input. Inductor 95 cuts-off the feedback path at high frequencies, where the phase shifts in amplifier 85 may cause conditions for oscillations and if chosen correctly increases the circuit bandwidth. In addition, resistor 96 is effectively the actual feedback element over the bandwidth of interest. To further achieve stable (e.g., non-oscillating) performance, amplifier 85 may include a wide band monolithic microwave integrated circuit (MMIC) amplifier (e.g., to provide gain up to 7 GHz).

FIG. 3 illustrates a flow diagram according to an embodiment herein. In step 100, the method of FIG. 3 describes receiving pulses of light pulses of light via a tapered fiber bundle (e.g., tapered fiber bundle 35), although this is optional. Step 101 describes producing a plurality of photocurrents (e.g., as produced from photo detector 40, 40A or 40B). Step 102 describes amplifying the plurality of photocurrents using a plurality of microwave amplifiers (e.g., microwave amplifiers 85). Next, at step 103, the method of FIG. 3 provides a plurality of feedback circuits (e.g., feedback circuit 92 or 92A). Step 104 describes combining the plurality of amplified photocurrents using a microwave combiner (e.g., microwave combiner 90). In step 105, the method of FIG. 4 describes processing and displaying the combined output (e.g., via computer 70 or other processor).

The techniques provided by the embodiments herein may be implemented on integrated circuit chips (not shown) with supporting computer code.

The embodiments herein can comprise hardware and software elements. The embodiments that are implemented in software include but are not limited to, firmware, resident software, microcode, etc. In addition, the hardware elements described herein may be simulated in software. For example, computer models of analog hardware elements described herein (e.g., lasers, microwave amplifiers, resistors, capacitors, and inductors) may be used in conjunction with emulators for discrete hardware elements described herein (e.g., FPGA emulators) to simulate operational parameters for the software elements of the embodiments described herein. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer readable medium include a semiconductor or solid state memory, magnetic tape (as represented by 113 in FIG. 4), thumb drive, a removable computer diskette, a random access memory (RAM), a read-only memory (ROM), a rigid magnetic disk (as represented by 111 in FIG. 4), and an optical disk. Examples of optical disks include compact disk-read only memory (CDROM), compact disk-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing a preferred embodiment of the present invention is depicted schematically in FIG. 4. This schematic drawing illustrates a hardware configuration of an information handling/computer system similar to that described in the '301 Patent, that may be used in conjunction with the embodiments herein. The system comprises at least one processor or central processing unit (CPU) 110. The CPUs 110 are interconnected via system bus 112 to various devices such as a random access memory (RAM) 114, read-only memory (ROM) 116, and an input/output (I/O) adapter 118. The I/O adapter 118 can connect to peripheral devices, such as disk units 111 and tape drives 113, or other program storage devices that are readable by the system. The system can read the inventive instructions on the program storage devices and follow these instructions to execute the methodology of the embodiments herein. The system further includes a user interface adapter 119 that connects a keyboard 115, mouse 117, speaker 124, microphone 122, and/or other user interface devices such as a touch screen device (not shown) to the bus 112 to gather user input. Additionally, a communication adapter 120 connects the bus 112 to a data processing network 125, and a display adapter 121 connects the bus 112 to a display device 123 which may be embodied as an output device such as a monitor, printer, or transmitter, for example.

Optionally, a field programmable gate array (FPGA) may be utilized to run a code that controls the basic functions of the LADAR and does some pre-processing of the image data before display. A trigger signal from the FPGA may be used to command a laser to emit a short pulse of light at a rate of 200 kHz into, for example, a single mode fiber. The laser size is 9×7×1.5 cm LWH), the pulse is 2-3 ns long with an energy of 2 µJ, and the power consumption is 10 W.

The preferred embodiment may comprise a micro-electro-mechanical system (MEMS) mirror 20 coupled to a low-cost pulsed erbium fiber laser. The preferred embodiment may utilize, for example, a 5-6 Hz frame rate, an image size of 256 (h)×128 (v) pixels, a 42°×21° field of regard, 35 m range, optional eye-safe operation, and 40 cm range resolution with provisions for super-resolution. The preferred embodiment may be used in conjunction with ground robots and unmanned aerial vehicle (UAV) applications. The data acquisition system has the ability to capture range data from three return pulses in a pixel (that is first, last, and largest return), and information such as elapsed time, operating parameters, and data from an inertial navigation system. Optionally, the preferred embodiment may comprise additional performance subsystems to obtain eye-safety certification. To meet the enhanced range requirement for the UAV application, receiver circuit of the preferred embodiment improves the signal-to-noise (SNR) several-fold over the prior art designs. A low-capacitance large area detector may be utilized to enable even further improvement in receiver SNR. The range capability is contemplated and estimated to be 160 m. Optionally, the preferred embodiment LADAR may be integrated with a color camera and inertial navigation system to build a data collection package to determine imaging performance for a small UAV.

The laser output fiber may be connected to the input fiber of a gradient index (GRIN) collimator to produce a light beam narrow enough to fit within the diameter of the MEMS mirror. Collimator 35A (as shown in FIG. 1) may, for example, have a beam diameter 0.4-0.5 mm and the divergence of 2 milliradians (mr). The collimator may be, for example, 3 mm in diameter and 13 mm long; which allows reduction in the size of the transmitter assembly.

The collimated light is directed onto the face of the MEMS mirror. The mirror is 1.2 mm in diameter and can be scanned in two axes up to +/−6 degrees or equivalently 12 degrees peak-to-peak. The overall MEMS chip size may be 4.5 mm square. The scan rate may be approximately 700 lines per second which is sufficient to form 256×128 pixel images at a 5-6 Hz rate. The mirror is steered by drive voltages generated from a digital representation of the scan pattern stored in a memory. These digital numbers are mapped to analog voltages with a digital-to analog convertor and amplified with a high voltage operational amplifier.

To increase the amount of scan angle the reflected laser beam is passed from the mirror into a beam telescope. Using the designer's model for the GRIN lens and an optical modeling code (Zemax), a lens combination for the beam telescope may be utilized that scans a beam +/−30° with +/−12° scan of an input beam. Small diameter lenses may be utilized to reduce the completed size of the transmitter subassembly. The first element in the beam telescope is a 12.7 mm diameter convex doublet with a focal length of 25 mm and the second is a 12.7 mm double concave lens with a focal length of −9.7 mm. The output beam divergence is approximately 4 mr which roughly matches the desired pixel format.

Light reflected from the image scene is detected with a receiver aperture that has a field-of-view encompassing the entire scanning range of the transmitter. This is a classic bi-static LADAR architecture which significantly eliminates numerous optical components and requires no precision alignment as compared to the mono-static architecture which shares a common transmit and receive aperture. The bi-static architecture also allows the receiver aperture to be made larger than the MEMS mirror which is the limiting aperture size for the mono-static architecture. Larger receiver apertures allow for higher signal-to-noise and therefore increased LADAR range capability for a given laser power.

A fiber bundle may be used instead of the traditional lens approach because for large field of views (FOVs (45°-60°), a lens will yield only small amounts of optical gain (1.4 for example for a 45° FOV) whereas the fiber bundle with an input to output diameter ratio of three provides gains of 4-5.

To further increase the amount of captured light the receiver uses a large area photodetector. Unfortunately large photodetectors present large capacitive loads to the input circuit of the following amplifier that limit its bandwidth to less than what is required to pass a 2-3 ns pulse. The key to achieving the necessary bandwidth is a feedback circuit 92 (comprised of a series resistor, capacitor, and inductor) connected between the input and the output of a low noise monolithic microwave integrated circuit (MMIC). The capacitor is used to simply block the difference in the DC levels between the amplifier input and output. The inductor opens the feedback path at high frequencies, where phase shift in the amplifier is sufficient to cause instability, and the resistor acts as the feedback element at the frequencies of interest. This receiver technique provides better signal-to-noise ratio (SNR) than the standard techniques using a small photodetector with a high gain transimpedance amplifier. Because the output diameter of the fiber taper is large, a two-fold improvement in SNR follows from placing four photodetectors behind the taper output and combining the outputs of four detector/amplifiers. The receiver design uses four 1.5 mm diameter PIN InGaAs photodetectors and provides sufficient SNR to detect average reflectivity targets to about 35-40 m in range.

The output from the combiner is followed by a lowpass filter stage to further increase SNR (refer back to FIG. 1). The filter output is separated into a low and a high gain channel where the purpose is to accommodate the large range of return signal levels caused by a combination of the scene reflectivity and space loss between near and far range targets. The output of each gain channel is a limiting differential amplifier to prevent large return signals from damaging the following analog-to-digital convertor.

The differential amplifiers respectively feed two analog-to-digital convertors (ADC) on the ADC/FPGA board. The ADCs may for example be a National Semiconductor chip (ADC08D15000) which is dual channel and samples at a rate of 1.5 giga-samples per second (GSPS) to 8-bit resolution. Because the laser pulse signals recovered by the receiver are unipolar, the differential output amplifiers on the receiver are biased with an offset current to enable sampling of the signals to the full 8-bit resolution available.

The output of the ADC is continuously clocked into the FPGA Double Data Rate (DDR) input registers. The data acquisition starts when the FPGA fires the laser and waits a predetermined latency period to begin to clock the DDR output into the input first-in-first-out (FIFO) register, which is 500 samples deep. The 500 samples, taken 0.667 ns apart, allow targets to be acquired up to 50 meters. After the FIFO is filled, it is then read-out and the samples are tagged with the output of a 9-bit range counter, which was started when the laser fired. The low gain channel is multiplied by a factor to approximate the difference in RF gain between the two channels. The two channels are combined into a single 14-bit wide channel for further processing. This combined channel is a correlated against a kernel with 5 coefficients that represent the shape of the transmitted laser pulse. This "matched filter" facilitates the recovery of signals in noise. The output of the correlator is then passed through a threshold circuit to detect the largest target returns. Given that multiple returns from a single transmitted laser pulse for a pixel is possible, one of three pulse types is selected for further processing: the first return received after a laser pulse is transmitted, the last return, or the highest amplitude return. All three return types may be processed but use of one of three is permissible. The selected return is then fed to an interpolation circuit to increase the LADAR range accuracy. The interpolator works by fitting the signal return to a parabola that has a similar shape and then finding the range value corresponding to the maximum of the fitted curve. The result is a range word that is represented with 13 bits instead of 9.

The field programmable gate array (FPGA) also controls the movement of the MEMS mirror. The code to set the mirror position uses a mirror scan memory map that contains the vertical and horizontal scan positions for the mirror as well as embedded code needed by the digital-to-analog convertor (DAC). The DAC converts the digital data to an analog signal needed to drive the mirror. Also embedded are the image synchronization signals H-sync and V-sync needed by the FPGA processor. H-sync and V-sync are the familiar horizontal and vertical signals. For horizontal image lines, the mirror is scanned in a serpentine pattern using a cosine wave. This technique eliminates ringing in the mirror movement that would be caused by the strong, high frequency transient in the flyback of a raster scan. The left and right edges of the scan are blanked where the mirror is moving very slowly at the turnaround. Display software linearizes the horizontal pixel data by compensating for the sinusoidal motion of the mirror and reverses every other line to correct for the serpentine motion. For the preferred embodiment vertical scan, a linear sawtooth wave may be utilized where during the slowly-changing portion of the sawtooth the vertical position of the mirror is incremented by one line during each horizontal blanking period. A short flyback portion of the vertical scan is blanked. The H-sync encoding denotes the first pixel in a line, while V-sync is encoded in the first pixel of each frame. To prevent miss-registration of the image data, a frame count and a delimiter is added to the data fed from the FPGA to the Ethernet board. The range and amplitude words are then sent to an output FIFO, which buffers the data between the 187.5-MHz input data rate with the 2z input rate of the Ethernet board.

The MEMS-scanned LADAR enclosure dimensions may be approximately 7.1" wide by 6.5" deep by 3.1" high; and total unit power consumption is about 20 W.

Recovery of Multiple Returns

The preferred embodiment LADAR has the capability to simultaneously process multiple target returns per pixel. Up to three target returns, if present, are characterized as the first return to arrive, the last return to arrive, and the largest amplitude return to arrive for a given pixel. This added capability will allow foliage penetration and increase the ability to see wires and other small objects.

The LADAR can also support a complete inertial system that includes a triaxal gyroscope, a triaxal accelerometer, and a triaxal magnetometer. This capability will allow multiple image frames to be 'stitched' together when the LADAR is mounted in a moving platform.

Figure 5A:
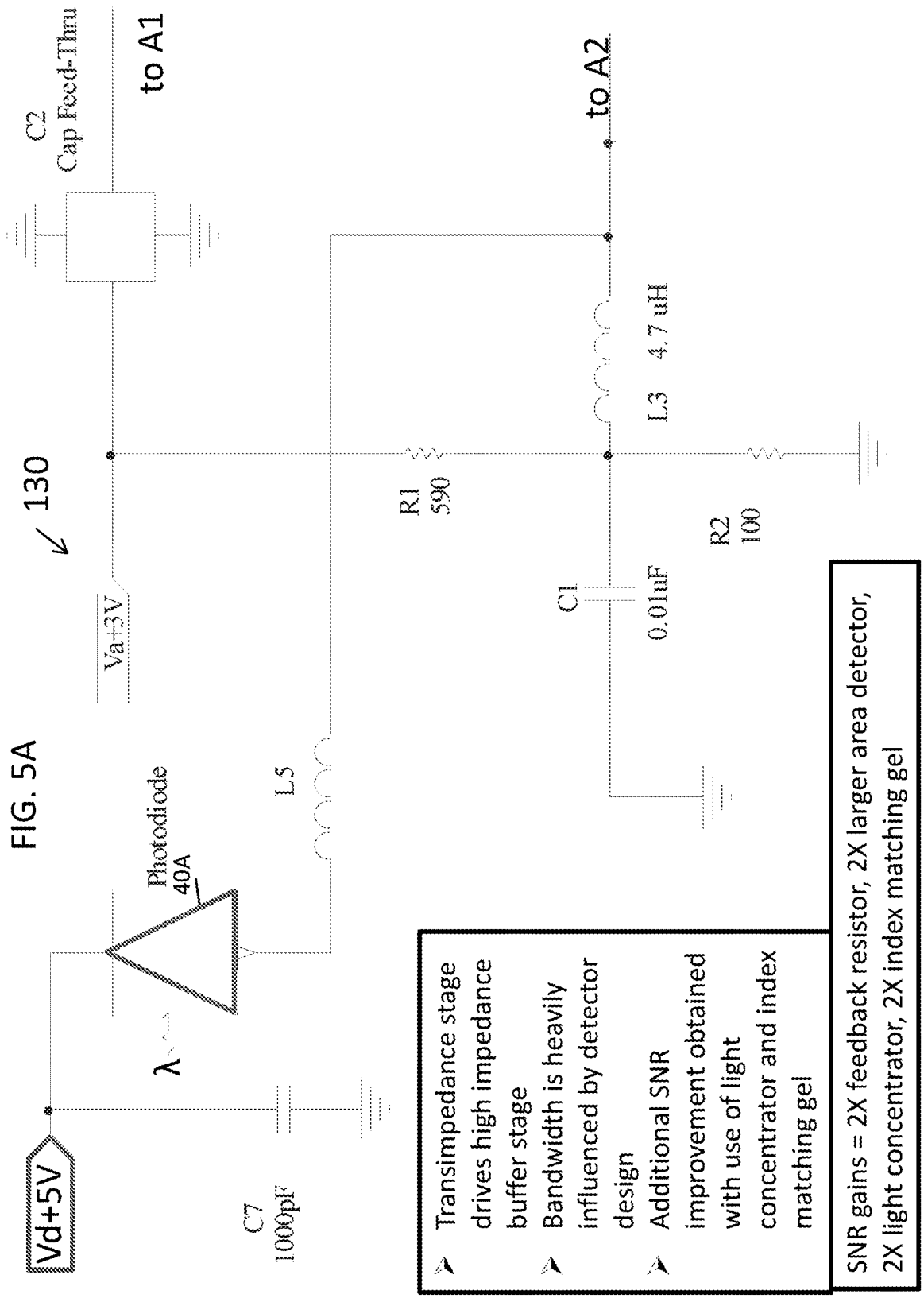
FIG. 5A is a schematic illustration (Part I) of a hardware configuration of a preferred embodiment of the invention herein.

Optionally, a 512 word header can be added to the output data stream that will hold various system parameters such as laser power, time, frame number etc. This will aid in archival purposes Enhanced Receiver This section refers to the enhanced receiver design depicted in FIGS. 5A and 5B. The systems depicted in FIGS. 1 and 2 are representative of those in U.S. Pat. No. 8,081,301 wherein a fiber optic taper is placed in the light path before the detector (photodiode 40 in FIG. 1) to increase the amount of detected light by a factor roughly related to the diameter of the input face to the output face of the fiber taper. Other non-imaging optical devices such as light concentrators are suitable for this purpose that perform similarly. Depending on the required LADAR field-of-view, short focal length lenses are also suitable to increase the amount of light impinging on the photodiode. Light emitted from the output of the preceding optical device is converted into a photo-current by the photodiode.

To raise the signal-to-noise of the receiver to meet LADAR range requirements for a given laser power, the receiver uses a large area photodiode to collect as much light as possible at the output of the leading optical device to yield a higher photocurrent. For the class of LADARs where high range resolution is required, the bandwidth of the photocurrent can range up to several hundred MHz. Achieving this bandwidth is difficult for large area photodiodes because they have large parallel capacitances that in concert with the amplifier input impedance, create a circuit that sharply attenuates the photocurrent signal. For instance a 3 mm diameter InGaAs PIN photodiode has a capacitance of 200 pF. This detector when fed directly into an amplifier with a 50 ohm input impedance forms a circuit that will have a bandwidth of only 16 MHz.

The photocurrent may be fed directly into the gate of transistor 85A. Two resistors R1, R2 in series from the 3V to ground and the middle goes to the gate of transistor 85A. These two resistors form a "bias network,' i.e. a combination of resistors used for biasing transistor 85A. The bias resistors can be used to set a voltage at the gate of transistor 85A to control the bias current of the transistor. To extend the receiver bandwidth to capture short light pulses (3 ns for example), a negative feedback or bypass circuit is utilized (similar to that in U.S. Pat. No. 8,081,301, herein incorporated by reference). The original and the new photocurrent amplifiers are both negative feedback designs. In the circuit described in the '301 patent an MMIC amplifier was utilized with a 50 ohm input resistance. In the simplest sense a 160 ohm resistor is connected between the input and the output of the amplifier. For the operating frequencies of the application 160 ohms in the feedback was possible. An analysis of the circuit reveals that the impedance presented at the input of the amplifier by the feedback resistor is roughly the resistance divided by the amplifier gain. The amplifier gain is a bit more than 10 so the presented impedance is 16 ohms or less. This means that the photocurrent mostly flows through the feedback resistor, that is $I_{amp}=V_{in}/50$ versus $I_{feedback}=V_{in}/16$. For the new photocurrent design of the preferred embodiment shown in FIGS. 5A, 5B, the input resistance of the E-PHEMT is very high with respect to 50 ohms and thus almost all of the photocurrent is drawn through the feedback resistor. R3.

Because of the feedback connection, a small output voltage change is returned back to the amplifier input through the resistor R3. A positive change in the output in the circuit results in a positive change at the input where the output signal is fed back. A change at the input will produce a negative change in the output voltage. Because the initially assumed change produces opposite results when propagated through the feedback loop, a signal that opposes and tends to cancel the originally assumed change correlates to negative feedback.

Note that in place of the MIMIC amplifier (used in the '301 Patent), an Enhancement mode Pseudomorphic High Electron Mobility Transistor (E-PHEMT) 85A may be used with the associated negative feedback or bypass circuit 92A comprised of R3, L2, and C3 connected between the transistor gate and the source. The E-PHEMT transistors have more gain than the MIMIC amplifier which enables the use of a larger feedback resistor (R3) for the same bandwidth. The values of the resistor R3 and inductor L2 operate to control or determine the amplifier's (85A) photocurrent gain and bandwidth. Preferably the gate impedance is high enough such that only a small proportion of the current from the sensor/photodiode 40A passes into the gate and through the amplifier 85A while a significantly larger portion passes through the bypass circuit 92A. The decoupling capacitor (e.g. C3) is configured to allow the bias of amplifier/transistor 85A to be established by the at least one biasing resistor, such as resistors R1 and R2. A large value for resistor R3 improves the noise performance of the photocurrent amplifier by reducing the Johnson noise from the resistor. E-PHEMTs also have a higher input impedance (2-4 pF capacitor versus 50 ohms for the MIMIC) that causes almost all of the photocurrent to flow through the bypass or negative feedback circuit 92A. This contributes to raising the feasible value of the feedback resistor R3 and thus reducing noise. Additionally, the noise figure of the E-PHEMT is also lower.

Significant increase in SNR is achievable by reducing the inductance, L5 to the lowest value possible. This can be done with careful layout of the receiver circuit board. The best approach is achieved when the photodiode is glued to a pad on the board and the anode is wire bonded to the Q1 gate of transistor 85A. Another method is to mount the photodiode in a leadless chip carrier which is then soldered to the lead on the board running to the E-PHEMT gate. The amplifier (transistor 85A) bandwidth may be extended by with judicious choice of the inductance, L2; which may be determined using circuit modelling codes such as SPICE.

Additional SNR is achieved through another means which is unique to this photocurrent amplifier. A second transistor/amplifier 85B, which also may be for example an E-PHEMT, is used as a buffer between 85A and following receiver circuitry thereby decoupling transistor/amplifier 85A from devices using standard 50 ohm input impedances. Resistors R4, R5 can be used to set a voltage at the gate of transistor 85B such that when the supply voltage is 3V (as shown in FIG. 5B) one can use two resistors R4, R5 in series from the 3V to ground and the middle goes to the gate of transistor 85B. The two resistors R4, R5 are called "bias resistors" since they "bias" the gate. These two resistors form a "bias network' i.e. a combination of resistors used for biasing a transistor. By biasing transistor/amplifier 85B with high value resistors, R4 and R5, a high load impedance is presented to transistor/amplifier 85A that effectively allows the amplifier to have more voltage gain relative to when it is loaded with 50 ohms. This increase in gain allows the use of a larger feedback resistor (R3) for the same bandwidth thereby improving the SNR.

The preferred embodiment enhanced receiver circuit is amenable to techniques to improve the overall LADAR receiver SNR by combining the outputs of several detector/amplifier circuits. As another approach, the inputs of multiple amplifiers circuits can be connected to one large photodiode. The outputs of transistors/amplifiers 85A, 85B can then be summed to raise the overall SNR of the LADAR receiver. The present invention is a clear improvement in terms of SNR relative to U.S. Pat. No. 8,081,301 "Ladar Architecture" disclosure. With the prior design, the LADAR could image to only about 30 m. Breadboards of the enhanced receiver where the SNR is at least a factor of four greater than the prior art show that imaging in excess of 50 m is possible. With the use of more laser power, imaging to 160 m is possible.

FIG. 6 is an illustration of a tapered light concentrator. A light concentrator is used as a low-cost alternative to fiber taper. The optical gain was found to exceed the gain of the fiber taper by a factor of two. Additional gain is achieved by using an index matching fluid between the output of the concentrator and the detector. Tests of a preferred embodiment receiver including the concentrator and index matching fluid against a 0.6 reflectivity a target at 10 m with a 1 kW laser pulse yielded a SNR equal to 448. When this result is extrapolated to a 20% target using four combined receivers and a 5 kW laser pulse, the range for a SNR of 5 is 173 m.

Eye-Safety System

Referring now to FIG. 7, an eye-safety system was designed and installed in the three brassboard MEMS-scanned LADARS to eliminate the requirement for the user to wear protective eye-wear. The purpose of the system was to shut-down the laser output if the scan function failed to prevent exposing anyone in the area to an ocular hazard arising from the non-scanned laser beam. For the MEMS-scanned LADAR, the safety system is required to shut-down the laser within 39 ms after scanning ceased for the present laser power.

A simplified block diagram of the preferred embodiment's optional eye safety system is shown in FIG. 7. In the FIG. 7 embodiment, the sinewave horizontal drive 135 and ramp vertical drive 136 for the MEMS mirror 20 is fed into their respective high voltage amplifiers 137, 138 and two ADC channels 139, 140 in the microprocessor 134. Light from a low-power red laser impinges on the MEMS mirror 20 and is reflected onto a silicon position sensing detector (PSD) 131. Current output from the position detector is converted into a voltages proportional to the X and Y positions of the red laser beam on the detector face and fed into ADCs 141, 142 in a microprocessor 134.

The decision to shut-down the laser is performed by code on the microprocessor. The ADCs sample the four input voltages at 4 kHz and load the data into four arrays that are 85 samples long. For the sinewave drive 135 and the PSD sinewave (132), the maximum and minimum of these two arrays are found over the first 20 samples of the respective data arrays. If the difference between the maximum and minimum is above 50 percent of the nominal value, the laser is permitted to continue operation. Both sinewaves are large signals with very little noise thus the standard deviation of the voltage differences are also very small and the probability of false alarm, that is shutting-down the laser unwarrantedly is very low. For the drive ramp, the situation becomes more complex because the change in signal voltage is small over the measurement array. A technique that provides low false alarm depends on computing the ramp slope using a least squares fit over the first half and second half of the data array. If the slope in both regions is below a set level, a command is sent to shut-down the laser. To prevent false alarms when the sampled region includes the ramp flyback, the absolute value of the slope calculated using the beginning and end of the half array is taken as the slope. The PSD ramp turned-out to be the most difficult signal because some of the sinewave signal has cross-coupled into it. In this case the slope using the least squares fit is computed over the full length of the data array. This done for two successive data arrays and if the slope is below a set value for both computations, a shut-down signal is sent. As with the drive ramp, the absolute value of the slope using the beginning and end values of the sampled file is computed to inhibit false alarms when the ramp flyback is present.

In testing the eye-safety system, if both horizontal and vertical drive signals are lost, laser shut-down occurred in about 20 ms. If the 150 V supply to the amplifiers 136, 137 driving the mirror scan failed, shut-down occurred also in about 20 ms. If the horizontal drive 135 to the mirror failed, shut-down occurred in 20 ms and if the vertical drive 136 failed, shut-down occurred in about 60 ms. This system was installed in the three brassboard LADARS.

FIG. 8 is an illustration showing an exemplary 4 hosel design for the light concentrators 35A. Shown in FIG. 8 is a portion of a case for a preferred embodiment receiver that includes four hosels for holding the light concentrators with a mechanism for allowing the introduction of the index matching gel (Shown). The scale (see ruler) in the figure is 6".

Large-Area and Low-Capacitance Detector

To further improve the SNR of the MEMS-scanned LADAR, shown in FIG. 9 is a large area low-capacitance detector or photodiode 40A used in conjunction with any of the preferred embodiments of the present invention. To the right in FIG. 9 are 5×5 arrays of 1×1 mm detectors. The 1×1 mm detectors may be connected with wirebonds. Regarding performance characteristics, obtainable with the preferred embodiment, capacitance is less than <12 pF/mm2; responsivity >0.8 A/W; and bandwidth: >250 MHz.

Calculations show that such a design is possible where the capacitance per unit area may be ⅕-⅐th the capacitance of the InGaAs detectors now used. Thus for the same capacitance, detectors with 5-7 times the light collection area are feasible that will provide the same bandwidth when coupled to the existing amplifier design. A rough calculation of the responsivity of these detectors (0.8 A/W) is slightly lower than for the InGaAs detectors (0.95 A/W). This reduces the photocurrent from the light collection area, but still leaves a significant SNR improvement of 4.2-5.9 times the value for an equivalent capacitance InGaAs detector. This SNR increase maps to a 2-2.4 fold improvement in LADAR range for the same SNR at the maximum range.

A detector 80A using Mercury Cadmium Telluride (MCT) on Silicon is illustrated in FIG. 10. The architecture is based on the N+-on P double layer planar heterostructure (See FIG. 10, right). The technique to reduce detector capacitance is to have small N+-regions in the P-type absorber in a sparse arrangement as in FIG. 10, left. This significantly reduces the junction capacitance relative to a standard photodiode design where the junction covers the entire detector area. Because the mobility of the minority carriers is high, the diffusion length or collection length, L is also high. L, however, places a limit on the maximum distance between the small junctions or lateral collection diodes to maintain good responsivity at the frequencies needed to capture the laser light pulse. Fortunately, L is large enough that the density of the lateral collection diodes is low enough to achieve the estimates for detector capacitance previously mentioned. A laid-out a mask for an array of 1 mm diameter detectors with the lateral collection diodes falling on a face-centered hexagonal close packed grid that in-turn are tied together at the metal level.

A preferred embodiment of the present invention is directed to MEMS-scanned LADAR capable of performing ground surveillance from a small UAV shown in FIG. 11. For example, a preferred embodiment LADAR may have the size, weight and power (SWAP) of 7"×6.5"×3.1"; 1.4 lbs (exclusive of enclosure) and 22 Watts which is suitable for unmanned aerial vehicle applications. The rate at which the LADAR forms pixels is sufficient to collect high fidelity imagery of the ground.

The LADAR package of the present invention may comprise a color camera and inertial navigation system. Software will be written to fuse the LADAR data with the camera imagery and display the result in near real-time.

The preferred embodiment LADAR is capable of use in conjunction with small UAVs flying at low altitudes with powerful capabilities. Because the LADAR is capable of collecting considerable redundant imagery foliage penetration is possible. Since the UAV flies at altitudes between 100 to 200 meters above ground level (AGL), ground image resolution of 30 cm is likely achievable. The system will be relatively low-cost thus it can be owned and operated by small units. The real-time, high angular resolution and foliage penetration capabilities of the LADAR/camera system will supply the user with high-quality imagery for mission planning, real-time mission observation, organizational systems placement, threat or security activity and location, and surveillance of area/object detection and identification. Examples of imagery collected with the subject LADAR are in FIG. 12 (long range) and FIGS. 13A and 13B (short range).

The ability of the preferred embodiment LADAR to capture the first, last, and largest return is likely to produce higher quality imagery and more information when working in highly cluttered environments. The INS information simultaneously collected in close proximity to the LADAR transmitter allows a user to stitch together multiple overlapping or contiguous images to improve penetration of foliage, eliminate shadows, and form registered large area images. Circuitry added to detect scan failure and shut-down the laser was utilized to obtain Class 1 certification from the US Army Public Health Command on the basis that laser emissions from the MEMS-scanned LADAR are not considered a significant risk for injury during normal use. The preferred embodiment enhanced receiver design improves the SNR of the LADAR receiver 4-5× that can be traded for reduced laser power for existing short-range applications or more range for new applications such as for UAVs. Research to build a low-capacitance, large-area detector will have further impact on reducing laser power or extending range without the use of high power lasers if the design proves feasible. Features of the present invention include multiple pulse detection, INS, eye-safety, and enhanced receiver provides support to recover quality imagery from complex and cluttered scenes.

As used herein, MEMS means Micro-electromechanical systems, such as Microelectromechanical systems (MEMS, also written as micro-electro-mechanical, MicroElectroMechanical or microelectronic and microelectromechanical systems and the related micromechatronics) is the technology of microscopic devices, particularly those with moving parts. It merges at the nano-scale into nanoelectromechanical systems (NEMS) and nanotechnology. MEMS are also referred to as micromachines in Japan, or micro systems technology (MST) in Europe. MEMS are made up of components between 1 and 100 micrometers in size (i.e. 0.001 to 0.1 mm), and MEMS devices generally range in size from 20 micrometers to a millimeter (i.e. 0.02 to 1.0 mm). They usually consist of a central unit that processes data (the microprocessor) and several components that interact with the surroundings such as microsensors . . . . At these size scales, the standard constructs of classical physics are not always useful. Because of the large surface area to volume ratio of MEMS, surface effects such as electrostatics and wetting dominate over volume effects such as inertia or thermal mass.

As used herein the term "target" means background, area of interest, zone of interest, location of motion, field of endeavor or the like. As used herein, the terminology "photocurrent" means an electric current induced by the action of light; a stream of electrons produced by photoelectric or photovoltaic effects. As used herein, the terminology "circuit" means a path between two or more points along which an electrical current can be carried. As used herein, the term "subcircuit" means a distinct portion of an electrical circuit; a circuit within another circuit. As used herein, the terminology "negative feedback" means a process by which a portion of an outputted signal, which may be either a voltage or a current, is used as an input. Negative feedback is opposite in value or phase ("anti-phase") to the input signal. As used herein, the terminology "high [point or element] impedance" means that a point in a circuit (a node) allows a relatively small amount of current through, per unit of applied voltage at that point. As used herein, the term "optimal" means most desirable or satisfactory result for an application or applications under specific conditions; resulting in the most favorable, reasonable conditions for operation of the system or device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

Further Enhanced Receiver

The various embodiments of the invention discussed above contemplate systems, apparatus, methods and the like configured to provide a LADAR receiver and/or components thereof. Generally speaking, a tapered fiber bundle is placed ahead of the photodetector to increase the amount of captured light. The fiber bundle is used instead of the traditional lens approach because for large field of view (FOV) a standard lens will typically yield only small amounts of optical gain (e.g., 1.7 for a 45° FOV) whereas the fiber bundle with an input to output diameter ratio of three provides gains of 4-5. Because the light field (power density) is mostly constant over the output of the fiber bundle, a large area photodetector captures more light and therefore will yield more SNR. Unfortunately, large photodetectors present large capacitive loads to the input circuit of the photodetector amplifier such that the amplifier bandwidth is limited to less than what is required to pass a 2-3 ns pulse. The key to achieving the necessary photodetector amplifier bandwidth is a feedback circuit (e.g., series-connected resistor, capacitor and inductor) connected between the input and the output of the photodetector amplifier, such as a low noise monolithic microwave integrated circuit (MMIC). The capacitor is used to simply block the difference in the DC levels between the amplifier input and output. The inductor provides a boost in the amplifier gain to extend the bandwidth and opens a feedback path at high frequencies, where a phase shift in the photodetector amplifier is sufficient to cause instability. The resistor acts as a feedback element responsive to the frequencies of interest.

If the LADAR bandwidth requirements can be met with a large area InGaAs detector, the gains from the large capture area in increasing the SNR most likely will exceed the benefits of the gain using a small InGaAs avalanche photodetector with a good transimpedance amplifier. Because the output diameter of the fiber taper is large, a two-fold improvement in SNR follows from placing four photodetectors behind the taper output and combining the outputs of four detector/amplifiers. An exemplary ground receiver design uses four 1.5 mm diameter InGaAs photodetectors and provides sufficient SNR to detect average reflectivity targets to about 35 m in range with a 400 mW laser.

The following discussion is related to an improved LADAR receiver advantageously providing improved SNR and other improvements such as reduction of the number of components and corresponding cost and improved resistance to oscillation. The various embodiments find utility within the context of ground-based and airborne LADAR receiver/processing systems. For example, both ground-based and airborne receivers may utilize a large area photodiode to collect as much light as possible at the output of a leading optical device to thereby yield as high a photocurrent as possible. For a class of LADAR where high range resolution is required, the bandwidth of the photo-current can range up to several hundred MHz. As noted above, achieving this bandwidth is difficult for large area photodiodes because they have large parallel capacitances that, in concert with the amplifier input impedance, create a circuit that sharply attenuates the photocurrent signal. For instance, a 3 mm diameter InGaAs PIN photodiode has a capacitance of approximately 200 pF at 5 V bias. This detector, when connected directly into an amplifier with a 50 ohm input impedance, forms a circuit that will have a bandwidth of only 16 MHz.

Figure 14:
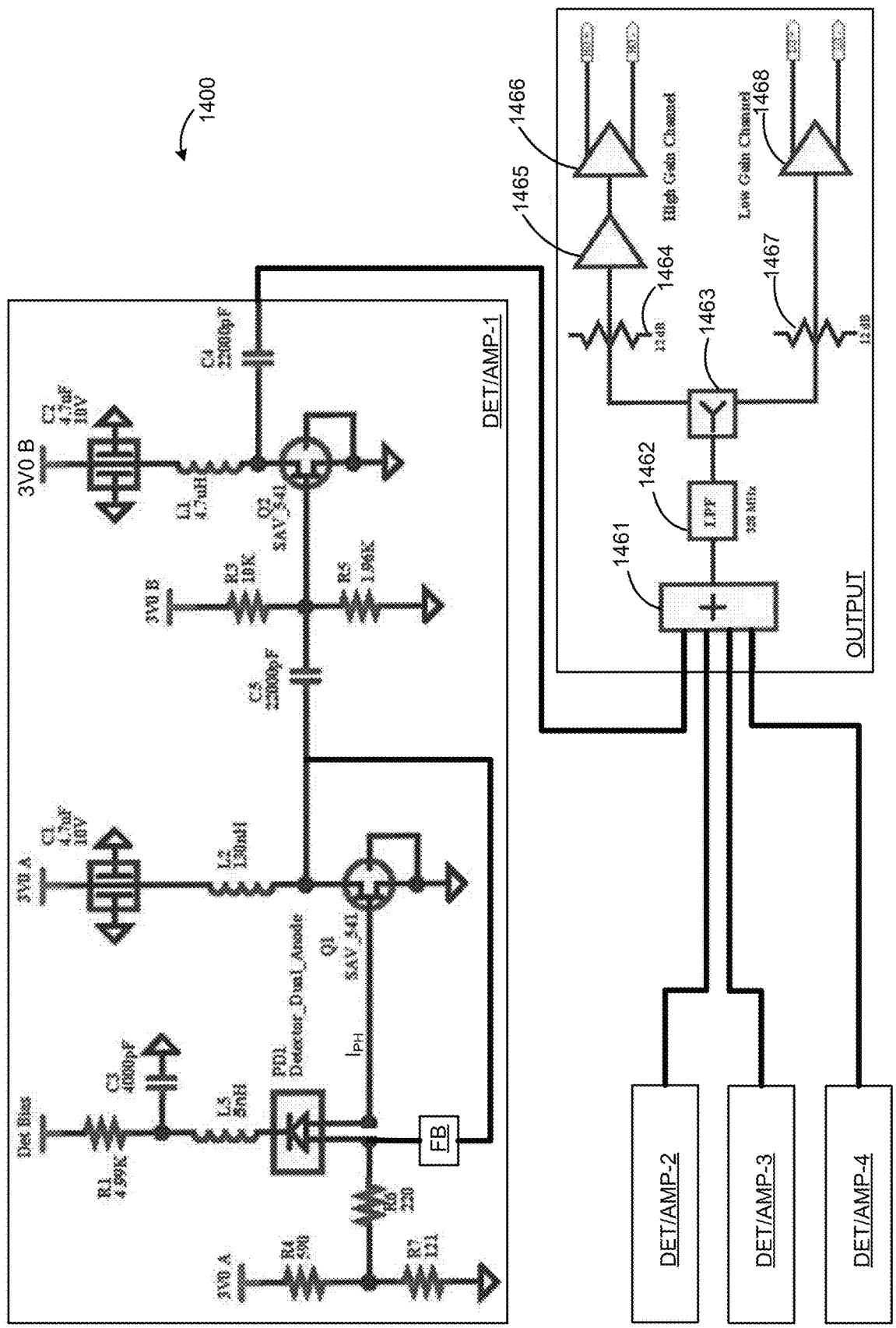
FIG. 14 depicts a circuit diagram of a LADAR receiver according to an embodiment.

FIG. 14 depicts a circuit diagram of a LADAR receiver according to an embodiment. The LADAR receiver 1400 of FIG. 14 may be used for ground-based or airborne LADAR systems.

The LADAR receiver 1400 of FIG. 14 comprises a plurality of detector/amplifier modules denoted as DET/AMP-1 through DET/AMP-4 and an output module OUT. It will be noted that while four detector/amplifier modules are depicted, various embodiments of the receiver 1400 may comprise more or fewer or even just one detector/amplifier module. Each of the detector/amplifier modules DET/AMP operates in the same manner.

Generally speaking, it is contemplated by the inventors that the teachings of FIG. 14 and associated description as presented herein, particularly that of the detector/amplifier modules DET/AMP, may be applied within the context of any of the embodiments described above with respect to the various other figures and their respective descriptions. Thus, any of the above embodiments may be modified to include the teachings of FIG. 14 and associated description as presented herein.

For example, the LADAR receiver circuitry described herein with respect to FIG. 14 (e.g., detector/amplifier module DET/AMP-1 and/or output module OUTPUT) may be used within the context of various embodiments such as described above with respect to other figures. For example, the detector/amplifier module described herein with respect to FIG. 14 may be used to replace LADAR receiver circuitry such as described and/or used within the embodiments discussed above with respect to FIGS. 5A-5B, FIG. 1, FIG. 2, FIG. 3, FIG. 9 and so on. It is noted that the LADAR receiver of FIG. 14 may be used in place of any of the LADAR receivers described above such as within a LADAR receiver, LADAR transmitter and/or other LADAR system utilizing LADAR receiver circuitry such as described herein with respect to FIG. 14. Further, the detector/amplifier modules DET/AMP described herein may be used to implement a photodetection/amplification circuit suitable for use in numerous applications such as, illustratively, photodetector 40/amplifier 45 as described above with respect to the various figures. Versions of the further enhanced receiver have routinely replaced receivers in prior LADAR systems to improve imaging performance at long ranges such as 150 m.

Referring now to FIG. 14, first detector/amplifier module DET/AMP-1 comprises a photodetector PD1 and a two-stage amplification circuit formed using Enhancement mode Pseudomorphic High Electron Mobility Transistors (E-PHEMTs). Advantageously, E-PHEMTs provide more gain than MIMIC amplifiers such that the feedback circuit (i.e., gate to drain feedback) may include a larger feedback resistor for the same bandwidth. In addition, the use of a large feedback resistor improves the noise performance of the photocurrent amplifier by reducing the effect of Johnson noise from the resistor. E-PHEMTs have a higher input impedance than MIMIC amplifiers (2-4 pF capacitor versus 50 ohms for the MIMIC) such that causes almost all of the photocurrent to flow through the feedback circuit. This contributes to raising the feasible value of the feedback resistor and thus reducing noise. Additionally, the noise figure of E-PHEMTs is lower than that for the MMIC. It is noted that the relatively low resistance values selected for use in the R4/R7 voltage divider are selected to prevent solar background current from substantially changing the bias voltage of Q1.

The photodetector PD1 comprises, illustratively, a 3 mm diameter detector operated at a bias voltage of 7 to 8 V to reduce the capacitance thereof. A first terminal of the photo detector PD1 is associated with a parasitic inductance L5 (~5 nH) and is coupled to a bias voltage source DetBias (e.g., 7-8V) via a resistor R1 (e.g., 4.99 k) and to ground via a capacitor C3 (e.g., 4 nF); a second terminal of the photo detector PD1 is coupled via a resistor R6 (e.g., 220 ohms) to a junction point of a voltage divider formed by resistors R4 (e.g., 590 Ohms) and R7 (e.g., 121 Ohms), which voltage divider resistors are coupled in series in the order named between a first voltage source (e.g., 3V) and ground; and a third terminal of the photo detector PD1 is coupled to a gate terminal of a transistor Q1.

In response to incident light, the photodetector PD1 generates a photocurrent $I_{PH}$, which is fed directly to the first amplification stage; namely, to a gate of transistor Q1 of the first amplification stage. The drain of transistor Q1 is connected via an inductor L2 (e.g., 130 nH) to first voltage source (e.g., 3V), which voltage source is also coupled to ground via a shielding capacitor C1 (e.g., 4.7 uF). The source of transistor Q1 is connected to ground.

A feedback circuit FB is coupled between the gate of transistor Q1 (via the second terminal of photodetector PD1) and the drain of transistor Q1. In one embodiment, the feedback circuit FB comprises a series connected resistor (illustratively 300 Ohm), inductor (illustratively, 200 nH) and capacitor (illustratively, 2.2 nF). In one embodiment, the feedback circuit FB comprises a very small capacitor (e.g., 1.5 pF). It is noted that such a very small capacitor may not require a discrete capacitor to implement; rather, the inherent and/or parasitic capacitance of a printed circuit board (PCB) upon which the circuit is formed and the intrinsic drain-to-gate capacitance of Q1 may operate to provide the necessary capacitance. More generally, the characteristics of the PCB may provide or be caused to provide resistance, capacitance and/or inductance within certain small ranges such that discrete components to provide a desired feedback reactance may be avoided or minimized.

It will be appreciated by those skilled in the art that a first 3-volt source (3 VO A) and a second 3-volt source (3 VO B)

depicted in FIG. 14 may both connect to a common 3V source, via circuit paths carefully laid out to improve isolation by avoiding ground loop current and the like. In various embodiments, different voltage sources may be used depending upon selected transistor types, circuitry and so on as would a known to those skilled in the art and informed by the teachings of the specification.

A significant increase in SNR and bandwidth is achieved by reducing to the lowest value possible the series inductance (L5) connecting the cathode of photodetector PD1 to ac ground and the anode of photodetector PD1 to the gate of transistor Q1. The combination of L5 and the photodetector capacitance forms a series resonant circuit that sets the first stage amplifier bandwidth lower than required. While the feedback circuit FB extends the first stage amplifier bandwidth, the ability to accomplish this is more difficult when the series resonant frequency is low. Raising the series resonant frequency requires lowering the value of L5; which may be accomplished via careful printed circuit board (PCB) layout of the receiver circuitry.

In one embodiment, such PCB layout is achieved via the cathode of photodetector PD1 being glued with conducting (e.g., silver) epoxy to a pad on the PCB, where the pad is ac coupled to the PCB ground, and the anode of photodetector PD1 being wire-bonded to the gate of transistor Q1. In another embodiment, photo detector comprises a photodiode mounted in a leadless chip carrier (LCC). The cathode of photodetector PD1 is glued to the metal base of the LCC, which is then soldered to a pad that is ac coupled to the circuit ground, while the anode of photodetector PD1 is wire-bonded to a pad in the LCC which is then soldered to a short circuit board trace running to the gate of transistor Q1.

The first amplification stage (photocurrent amplification) provides an output signal which is buffered from subsequent receiver circuitry via the second amplification stage to thereby achieve additional SNR improvements. Specifically, the output of the first amplification stage (i.e., the signal at the drain of transistor Q1) is coupled to the second amplification stage via a capacitor C5 (e.g., 22 nF).

The second amplification stage comprises a second E-PHEMT, transistor Q2, which operates as a buffer between transistor Q1 and subsequent receiver circuitry to thereby decouple transistor Q1 from devices using standard 50 ohm input impedances. Specifically, by biasing the gate of transistor Q2 with high value resistors, R3 and R5 (e.g., 10 k and 1.96 k, respectively), a high load impedance (i.e., greater than 50 Ohms) is presented to transistor Q1 which effectively allows the first amplification stage to have more voltage gain relative to when loaded with 50 ohms. This increase in gain allows the use of a larger feedback resistor for the same bandwidth, thereby improving the SNR. Optionally, the second stage of the detector/amplifier module DET/AMP-1 includes an additional load (e.g., 10 ohms) at the output of Q2 for reducing overall gain if required. The second amplification stage (buffer) provides an output signal (i.e., the signal at the drain of transistor Q2) that is coupled to the output module via a capacitor C4 (e.g., 22 nF).

The output module OUTPUT improves overall LADAR SNR by combining the outputs of several detector/amplifier circuits (illustratively four). As depicted in FIG. 14, the respective output signal provided by each of the detector/amplifier modules DET/AMP-1 through DET/AMP-4 is coupled to a respective input of a passive microwave summer or combiner 1416, which produces a combined signal that is coupled to a lowpass filter 1462 having a transfer function selected to pass the detected pulse with little to no distortion. To increase the overall dynamic range of the receiver, a power divider 1463 divides the output signal from the lowpass filter 1462 into two signals; one signal for use by a high gain channel, and one signal for use by a low gain channel. Amplitude adjusters 1464 and 1467 adjust, respectively, the high gain channel signal amplitude and low gain channel signal amplitude as needed. Amplifier 1465 amplifies the high gain channel signal as needed. The output of each gain channel is a limiting differential amplifier 1466/1468 to prevent large return signals from damaging the following analog-to-digital convertor (not shown). The output module OUTPUT performs the various functions necessary to provide high gain channel output and low gain channel output for use as described above with respect to the various figures.

In various embodiments, the circuitry discussed herein with respect to FIG. 14 as well as the other figures may be implemented using transistor types other than the E-PHEMT described above, such as Field Effect Transistors (FETs), Bipolar Junction Transistors (BJTs) and so on. In these embodiments the circuitry may be modified in accordance with the operation of the other type of transistor, and the language used herein to describe the operation of the E-PHEMT is also modified as would be known to those skilled in the art (e.g., to reflect a BJT having a base, collector and emitter rather than a gate, drain and source).

Figure 15:
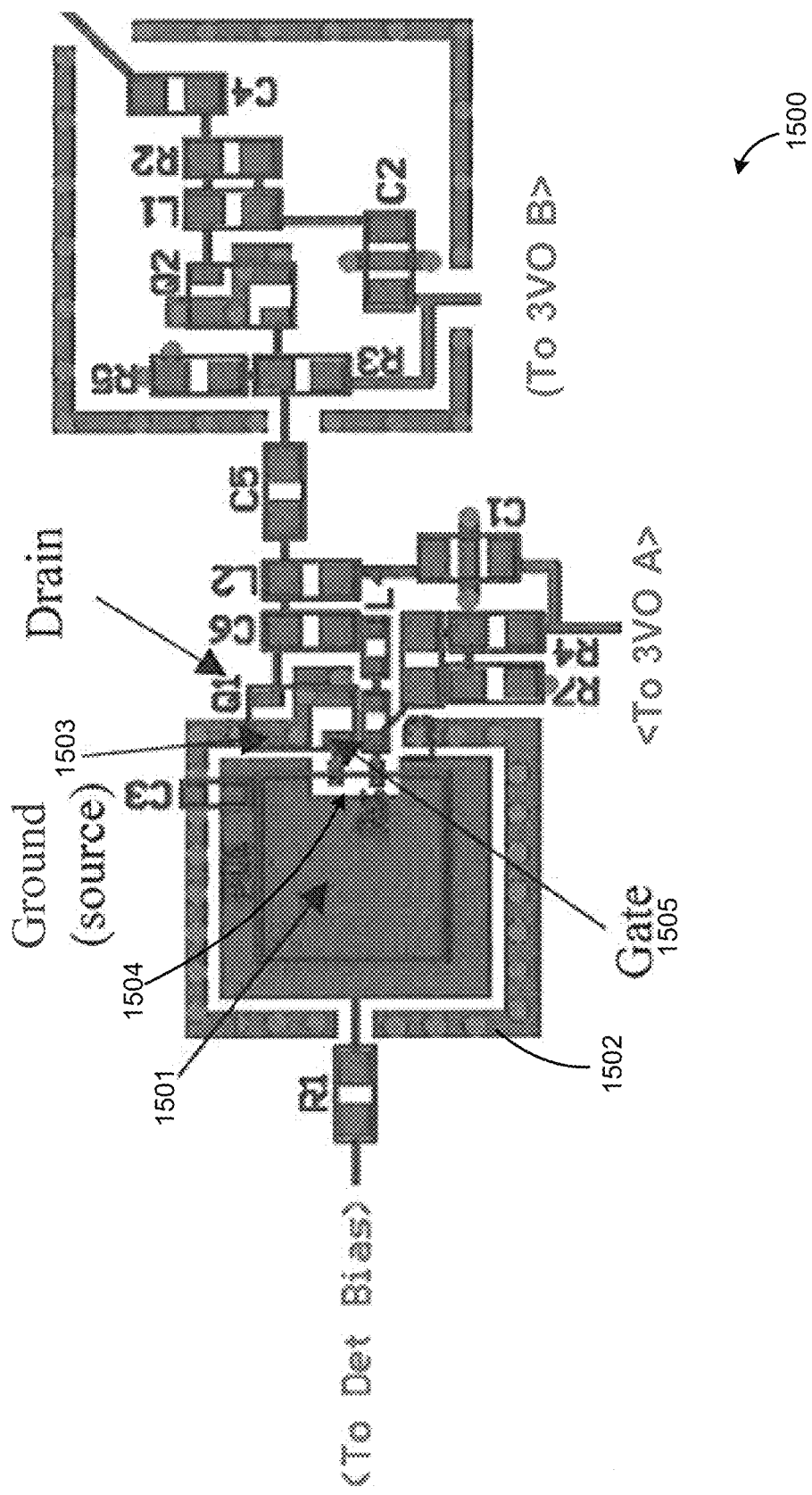
FIG. 15 depicts a top layer of a PCB layout of a LADAR receiver circuit board according to an embodiment.

The various embodiments described herein with respect to FIGS. 14-15 operate to draw the photo detector current $I_{PD}$ through the feedback circuit FB. The components of the feedback circuit FB may be selected to form a component of the resonant circuit described herein, which advantageously increases spectral range of the relevant passband up to several hundred megahertz to proximally 2 GHz depending upon impedance/reactance characteristics of the selected transistor and associated circuitry, as well as the capacitance of the photo detector PD1. For example, a 3 mm diameter photodetector may have a 200 pF capacitance, whereas a 1 mm diameter photodetector may have a 30 pF capacitance. Further, the characteristics of the loading impedance imparted to the first amplifier may be configured to flatten high frequency portions of the noise spectrum such as by changing the R3/R5 resistor divider values from approximately 10 k/2 k to 5 k/1 k or 2.5 k/0.5 k. Further, the characteristics of the loading experienced by the photodetector PD1 may be modified by changing the value of resistor R6 from 220 ohms to some another resistance value (depending upon residence or configurations as discussed herein) or even replacing resistor R6 with an inductor selected to have an open circuit reactance at the relevant frequencies of interest.

FIG. 15 depicts a top layer of a PCB layout of a LADAR receiver circuit board suitable for implementing both RLC feedback and capacitive feedback embodiments of the LADAR receiver of FIG. 14.

It is noted that an important consideration in the PCB layout was a reduction in lead inductance of the connection between the cathode of photodetector PD1 to ground, and the connection between the anode of photodetector PD1 and the gate of transistor Q1. Therefore, as implemented on the PCB of FIG. 15, the bottom of a leadless chip carrier (LCC) holding the photodetector PD1 is soldered directly to a large pad 1501 disposed below it. Pad 1501 is nearly completely surrounded by a trace 1502 that is connected to the underlying ground plane via an array of plated through holes.

A pad for connecting with the cathode of photodetector PD1 is ac coupled to the first transistor ground pin 1503 by a capacitor C3 positioned close to that pad. The anode of photodetector PD1 is connected to two pins 1504 on the LCC that are soldered to respective small pads on the PCB, which pads are very close to the gate 1505 of transistor Q1.

For capacitive feedback embodiments, the pads for C6, L4, and R6 are removed. The circuit layout for the buffer transistor Q2 is less critical, thus less crowding of the components is evident. The grounded trace mostly surrounding Q2 circuitry can be used to solder a box-like shield to suppress oscillations if this occurs. In various embodiments, the PCB is configured with wider ground traces to ease soldering of the shield. Another important means to suppress oscillations is implemented by splitting the ground plane beneath C5 with a small gap (e.g. 0.05") that runs vertically in the figure nearly to the periphery of the PCB. This split sharply reduces surface currents on the ground plane induced at the output of Q2 from coupling into the input of Q1.

Thus, as described above, the various embodiments comprise methods and apparatus suitable for use in forming a laser receiver or portions thereof, including various permutations of such laser receiver and portions thereof formed by combining different elements as described and shown herein in multiple ways, all of which are contemplated by the inventor.

For example, in one embodiment a laser receiver comprises a photodetector, configured to generate a photocurrent in response to incident light, the photodetector being associated with a capacitance and configured to operate at a bias voltage level above ground, wherein a resonant circuit is formed in accordance with the photodetector capacitance and an inductive coupling of the photodetector to ground, wherein the inductive coupling of the photodetector to ground is minimized using multiple ground connections of the photodetector when mounted on a printed circuit board (PCB); a first amplifier including a first Enhancement mode Pseudomorphic High Electron Mobility Transistor (E-PHEMT) configured to amplify the photocurrent received from the photodetector to produce a first output signal, the first transistor comprising a gate coupled to receive the photocurrent, a source coupled to ground, and a drain coupled to a second bias voltage via an inductor and coupled to the photodetector via a feedback circuit comprising at least a capacitance, wherein the feedback circuit operates to limit a reduction in first amplifier bandwidth caused by the resonant circuit; a second amplifier including a second E-PHEMT, the second amplifier configured to present a high impedance load to the first output signal and responsively generate a second output signal.

In various embodiments, the inductive coupling of the photodetector to ground is minimized by the photodetector being glued directly to a grounding pad of the PCB using a conducting epoxy. Further, the grounding pad of the PCB may comprise a plurality of through holes disposed therethrough and electrically cooperating with a ground plane of the PCB. Further, the anode of the photodetector may be wire-bonded to the gate of the first transistor. Further, the inductive coupling of the photodetector to ground may minimized by the photodiode being mounted in a leadless chip carrier (LCC), wherein a cathode of photodetector may be glued to a metal base of the LCC using a conducting epoxy, the metal base being soldered to a conductive pad that is ac coupled to ground. Further, an anode of the photodetector may be wire-bonded to a pad in the LCC, the LLC pad being soldered to a minimal length circuit board trace connected to the gate of the first transistor.

The laser receiver may be configured to receive light reflected from a target illuminated by a laser configured to emit light at an intensity safe for human eyes and wherein a target is discernible in a range from 0.3 to 1000 meters.

The laser receiver may further comprise at least one of a tapered fiber bundle or light concentrator operative to receive light operatively connected to photodetector; and wherein the laser receiver is configured to receive light of a predetermined frequency and modulation format reflected from a target illuminated by a laser.

The laser receiver may further comprise a plurality of sub-receivers and wherein the output of each of the plurality of sub-receivers is substantially redundant and each output is connected to a combining circuit that is operatively connected to the processing unit.

The laser receiver may be operatively connected in a circuit to at least one other laser receiver to operate in parallel at the same or different frequencies, such as where the output of each of a plurality of receivers is substantially redundant and each output is connected to a combining circuit that is operatively connected to the processing unit. For example the at least one other laser receiver may comprise: at least a second one of a tapered fiber bundle or light concentrator operative to receive light operatively connected to photodetector; and wherein the second laser receiver is configured to receive light of a predetermined frequency and modulation format reflected from a target illuminated by a laser; a second photodetector, configured to generate a photocurrent in response to incident light, the photodetector being associated with a capacitance and configured to operate at a bias voltage level above ground, wherein a second resonant circuit is formed in accordance with the photodetector capacitance and an inductive coupling of the photodetector to ground, wherein the inductive coupling of the photodetector to ground is minimized using multiple ground connections of the photodetector when mounted on a printed circuit board (PCB); a third amplifier including a third Enhancement mode Pseudomorphic High Electron Mobility Transistor (E-PHEMT) configured to amplify the photocurrent received from the second photodetector to produce a third output signal, the third transistor comprising a gate coupled to receive the third output signal, a source coupled to ground, and a drain coupled to a third bias voltage via an inductor and coupled to the second photodetector via a second feedback circuit comprising at least a capacitance, wherein the second feedback circuit operates to limit a reduction in third amplifier bandwidth caused by the second resonant circuit; and a fourth amplifier including a fourth E-PHEMT, the fourth amplifier configured to present a high impedance load to the third output signal and responsively generate a fourth output signal.

In various experiments, the inventors used the receiver circuitry without a case. In other experiments, a case was built using milled aluminum stock wherein the case was also configured to secure light concentrators, solar filters and the like. In other experiments, a case was built using 3D printing with partially conducting plastic such that PCB trace interference was minimized via built-in shielding and the like.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A laser receiver, comprising:
a photodetector, configured to generate a photocurrent in response to incident light, the photodetector being associated with a capacitance and configured to operate at a bias voltage level above ground, wherein a resonant circuit is formed in accordance with the photodetector capacitance and an inductive coupling of the photodetector to ground, wherein the inductive coupling of the photodetector to ground is minimized using multiple ground connections of the photodetector when mounted on a printed circuit board (PCB);
a first amplifier including a first transistor configured to amplify the photocurrent received from the photodetector to produce a first output signal, the first transistor comprising a gate coupled to receive the photocurrent, a source coupled to ground, and a drain coupled to a second bias voltage via an inductor and coupled to the photodetector via a feedback circuit comprising at least a capacitance, wherein the feedback circuit operates to limit a reduction in first amplifier bandwidth caused by the resonant circuit;
a second amplifier including a second transistor, the second amplifier configured to present a high impedance load to the first output signal and responsively generate a second output signal.

2. The laser receiver of claim 1, wherein the transistors comprise an Enhancement mode Pseudomorphic High Electron Mobility Transistor (E-PHEMT).

3. The laser receiver of claim 1, wherein the transistors comprise any of an Enhancement mode Pseudomorphic High Electron Mobility Transistor (E-PHEMT), a Field Effect Transistors (FET) and a Bipolar Junction Transistor (BJT).

4. The laser receiver of claim 1, wherein the inductive coupling of the photodetector to ground is minimized by the photodetector being glued directly to a grounding pad of the PCB using a conducting epoxy.

5. The laser receiver of claim 4, wherein the grounding pad of the PCB comprises a plurality of through holes disposed therethrough and electrically cooperating with a ground plane of the PCB.

6. The laser receiver of claim 4, wherein an anode of the photodetector is wire-bonded to the gate of the first transistor.

7. The laser receiver of claim 1, wherein the inductive coupling of the photodetector to ground is minimized by the photodiode being mounted in a leadless chip carrier (LCC), wherein a cathode of photodetector is glued to a metal base of the LCC using a conducting epoxy, the metal base being soldered to a conductive pad that is ac coupled to ground.

8. The laser receiver of claim 7, wherein an anode of the photodetector is wire-bonded to a pad in the LCC, the LLC pad being soldered to a minimal length circuit board trace connected to the gate of the first transistor.

9. The laser receiver of claim 1, whereby the receiver is configured to receive light reflected from a target illuminated by a laser configured to emit light at an intensity safe for human eyes and wherein a target is discernible in a range from 0.3 to 1000 meters.

10. The laser receiver of claim 9 wherein the receiver comprises at least one of a tapered fiber bundle or light concentrator operative to receive light operatively connected to photodetector; and wherein the laser receiver is configured to receive light of a predetermined frequency and modulation format reflected from a target illuminated by a laser.

11. The laser receiver of claim 1, wherein the laser receiver comprises a plurality of sub-receivers and wherein the output of each of the plurality of sub-receivers is substantially redundant and each output is connected to a combining circuit that is operatively connected to the processing unit.

12. The laser receiver of claim 1, wherein the first and second amplifiers have a combined bandwidth sufficient to pass a modulated photocurrent at a frequency up to 500 MHz; the second amplifier comprising an output configured to be operatively connected to a processing unit and a display unit displaying output from the processing unit in the form of pixels, the display being of sufficient quality to display an image of a target at 1000 meters,
whereby the receiver is configured to receive light reflected from a target illuminated by a laser configured to emit light at an intensity safe for human eyes and wherein a target is discernible in a range from 0.3 to 1000 meters.

13. The laser receiver of claim 10 operatively connected in a circuit to at least one other laser receiver, the at least one other laser receiver comprising:
at least a second one of a tapered fiber bundle or light concentrator operative to receive light operatively connected to photodetector; and wherein the second laser receiver is configured to receive light of a predetermined frequency and modulation format reflected from a target illuminated by a laser;
a second photodetector, configured to generate a photocurrent in response to incident light, the photodetector being associated with a capacitance and configured to operate at a bias voltage level above ground, wherein a second resonant circuit is formed in accordance with the photodetector capacitance and an inductive coupling of the photodetector to ground, wherein the inductive coupling of the photodetector to ground is minimized using multiple ground connections of the photodetector when mounted on a printed circuit board (PCB);
a third amplifier including a third Enhancement mode Pseudomorphic High Electron Mobility Transistor (E-PHEMT) configured to amplify the photocurrent received from the second photodetector to produce a third output signal, the third transistor comprising a gate coupled to receive the third output signal, a source coupled to ground, and a drain coupled to a third bias voltage via an inductor and coupled to the second photodetector via a second feedback circuit comprising at least a capacitance, wherein the second feedback circuit operates to limit a reduction in third amplifier bandwidth caused by the second resonant circuit; and a fourth amplifier including a fourth E-PHEMT, the fourth amplifier configured to present a high impedance load to the third output signal and responsively generate a fourth output signal.

14. The laser receiver of claim 13, wherein each of the plurality of receivers operates in parallel with the at least one other receiver and wherein the output of each of the plurality of receivers is substantially redundant and each output is connected to a combining circuit that is operatively connected to the processing unit.

15. The laser receiver of claim 12, wherein the laser receiver has the capability to simultaneously process multiple target returns per pixel.

16. The laser receiver of claim 15 wherein each pixel of the display represents a point in the area surrounding the target and wherein the light from the laser reflected from the target area comprises the first return to arrive at the receiver for a given pixel, the last return to arrive for a given pixel, and the largest amplitude return to arrive for a given pixel; and wherein the processing unit operates to select one or more of the returns which allows foliage penetration and increases the ability to see wires and other small objects.

17. The laser receiver of claim 15 wherein the receiver is operated in tandem with an inertial system that comprises one of a triaxal gyroscope, a triaxal accelerometer, and a triaxal magnetometer.

18. The laser receiver of claim 12 wherein the processing unit operates to join together multiple image frames when the receiver is mounted in a moving platform.

19. A method of operating a laser receiver, comprising:
at a photodetector, generating a photocurrent in response to incident light, the photodetector being associated with a capacitance and configured to operate at a bias voltage level above ground, wherein a resonant circuit is formed in accordance with the photodetector capacitance and an inductive coupling of the photodetector to ground, wherein the inductive coupling of the photodetector to ground is minimized using multiple ground connections of the photodetector when mounted on a printed circuit board (PCB);
at a first amplifier including a first Enhancement mode Pseudomorphic High Electron Mobility Transistor (E-PHEMT), amplifying the photocurrent received from the photodetector to produce a first output signal, the first transistor comprising a gate coupled to receive the photocurrent, a source coupled to ground, and a drain coupled to a second bias voltage via an inductor and coupled to the photodetector via a feedback circuit comprising at least a capacitance, wherein the feedback circuit operates to limit a reduction in first amplifier bandwidth caused by the resonant circuit;
at a second amplifier including a second E-PHEMT, presenting a high impedance load to the first output signal and responsively generate a second output signal.

* * * * *